(12) United States Patent
You et al.

(10) Patent No.: US 11,994,607 B2
(45) Date of Patent: May 28, 2024

(54) LOCATION INFORMATION ADJUSTMENT METHOD AND SYSTEM, AND DEVICE

(71) Applicant: HUAWEI TECHNOLOGIES CO., LTD., Guangdong (CN)

(72) Inventors: Jiajia You, Wuhan (CN); Yong Chen, Wuhan (CN); Jianhui Li, Shenzhen (CN); Zengcai Sun, Wuhan (CN); Qi Wang, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 18/191,998

(22) Filed: Mar. 29, 2023

(65) Prior Publication Data

US 2023/0251345 A1 Aug. 10, 2023

Related U.S. Application Data

(63) Continuation of application No. PCT/CN2021/120539, filed on Sep. 26, 2021.

(30) Foreign Application Priority Data

Sep. 30, 2020 (CN) .......................... 202011066545.4

(51) Int. Cl.
*G01S 5/18* (2006.01)
*G06F 3/14* (2006.01)

(52) U.S. Cl.
CPC .............. *G01S 5/18* (2013.01); *G06F 3/1446* (2013.01)

(58) Field of Classification Search
CPC .... G06F 3/0488; G06F 1/1632; G06F 1/1683; G06F 1/1654; G06F 3/048; G06F 1/1647;
(Continued)

(56) References Cited

U.S. PATENT DOCUMENTS

2013/0111369 A1* 5/2013 Pasquero ............... H04N 23/66
715/761
2013/0198392 A1* 8/2013 Hymel .................... G06F 3/013
709/227
(Continued)

FOREIGN PATENT DOCUMENTS

CN 103218196 A 7/2013
CN 103698747 A 4/2014
(Continued)

*Primary Examiner* — Shaheda A Abdin
(74) *Attorney, Agent, or Firm* — WOMBLE BOND DICKINSON (US) LLP

(57) ABSTRACT

A first electronic device determines that a first trigger condition is satisfied, sends a first instruction to enable a first sound wave transmitter to send a first sound wave signal, and sends a second instruction to enable a second sound wave transmitter to send a second sound wave signal. A second electronic device sends a third instruction to enable a first sound wave receiver to receive the first sound wave signal and the second sound wave signal, calculates a first receiving start moment and a second receiving start moment, obtains first location information, determines second location information based on the first receiving start moment, the second receiving start moment, and the first location information, and sends the second location information to the first electronic device. The first electronic device updates third location information by using the second location information.

20 Claims, 22 Drawing Sheets

(58) Field of Classification Search
CPC ...... G06F 3/167; G06F 1/1649; G06F 3/1423; G06F 1/1637; G06F 2200/1614; G06F 2200/1636; G09G 2370/16; G09G 2356/00; G09G 2370/06
See application file for complete search history.

(56) References Cited

U.S. PATENT DOCUMENTS

| | | |
|---|---|---|
| 2013/0201097 A1 | 8/2013 | Pasquero et al. |
| 2014/0320387 A1* | 10/2014 | Eriksson ................ G06F 3/017 345/156 |
| 2014/0333422 A1 | 11/2014 | Phang et al. |
| 2014/0337791 A1* | 11/2014 | Agnetta .................... G06F 3/16 715/784 |
| 2016/0148011 A1* | 5/2016 | Lee ........................ G06F 21/629 726/28 |
| 2018/0091898 A1 | 3/2018 | Yoon et al. |

FOREIGN PATENT DOCUMENTS

| | | |
|---|---|---|
| CN | 104731545 A | 6/2015 |
| CN | 104808746 A | 7/2015 |
| CN | 105164631 A | 12/2015 |
| CN | 109189353 A | 1/2019 |
| CN | 109804644 A | 5/2019 |
| KR | 20130092244 A | 8/2013 |
| WO | 2020103066 A1 | 5/2020 |
| WO | WO-2020103066 A1 * | 5/2020 |

* cited by examiner

LOCATION INFORMATION ADJUSTMENT METHOD AND SYSTEM, AND DEVICE

CROSS-REFERENCE TO RELATED APPLICATIONS

This application is a continuation of International Patent Application No. PCT/CN2021/120539, filed on Sep. 26, 2021, which claims priority to Chinese Patent Application No. 202011066545.4, filed on Sep. 30, 2020. The disclosures of the aforementioned applications are hereby incorporated by reference in their entireties.

TECHNICAL FIELD

This application relates to the field of intelligent terminal technologies, and in particular, to a location information adjustment method and system, and a device.

BACKGROUND

In a system including a plurality of electronic devices, location information sometimes may be set in one or more of the electronic devices. The location information is used to record a relative location relationship in physical space between the electronic devices in the system (a physical relative location for short below).

Currently, location information in an electronic device is generally manually set by a user. For a common user, it is complicated and tedious to find a setting interface of the location information, and then manually sets the location information. In addition, after the physical relative location between the electronic devices in the system changes, the user may manually reset the location information in the one or more electronic devices, which further increases operation complexity and affects user experience.

SUMMARY

This application provides a location information adjustment method and system, and a device, to automatically set location information in an electronic device, thereby improving user experience.

According to a first aspect, this application provides a location information adjustment system, where a first electronic device determines that a first trigger condition is satisfied, where the first trigger condition is for triggering detection of a relative location relationship between the first electronic device and a second electronic device; the first electronic device sends a first instruction, where the first instruction is for enabling a first sound wave transmitter to send a first sound wave signal; and the first electronic device sends a second instruction, where the second instruction is for enabling a second sound wave transmitter to send a second sound wave signal; the first sound wave signal and the second sound wave signal have different amplitudes and/or frequencies; and the first sound wave transmitter and the second sound wave transmitter are disposed in the first electronic device. The second electronic device sends a third instruction, where the third instruction is for enabling a first sound wave receiver to receive the first sound wave signal and the second sound wave signal, and the first sound wave receiver is disposed in the second electronic device; the second electronic device calculates a first receiving start moment and a second receiving start moment, where the first receiving start moment is a start moment when the first sound wave receiver receives the first sound wave signal, and the second receiving start moment is a start moment when the first sound wave receiver receives the second sound wave signal; the second electronic device obtains first location information, and determines second location information based on the first receiving start moment, the second receiving start moment, and the first location information, where the first location information is for describing that the first sound wave transmitter is located on a left side of the second sound wave transmitter based on an angle from which a user watches the first electronic device; and the second location information is for describing a left-right relative location relationship between the first electronic device and the second electronic device based on an angle from which the user watches a display screen of the second electronic device; the second electronic device sends the second location information to the first electronic device; and the first electronic device receives the second location information, and updates third location information by using the second location information, where the third location information is for describing the left-right relative location relationship between the first electronic device and the second electronic device based on an angle from which the user watches a display screen of the first electronic device. After the first electronic device determines that the trigger condition is satisfied, the system automatically completes detection of a physical relative location between the first electronic device and the second electronic device and update of the preset third location information in the first electronic device without manual setting by the user, thereby improving user experience.

In a possible embodiment, sending moments of the first sound wave signal and the second sound wave signal are the same; and that the second electronic device determines second location information based on the first receiving start moment, the second receiving start moment, and the first location information includes: The second electronic device determines a time sequence of the first receiving start moment and the second receiving start moment. If a result of the determining is that the first receiving start moment is earlier than the second receiving start moment, determines the second location information as first information, where the first information is for describing that the second electronic device is located on a left side of the first electronic device based on the angle from which the user watches the display screen of the second electronic device; or if a result of the determining is that the first receiving start moment is later than the second receiving start moment, determines the second location information as second information, where the second information is for describing that the second electronic device is located on a right side of the first electronic device based on the angle from which the user watches the display screen of the second electronic device. The method provides a possible embodiment of determining the second location information.

In a possible embodiment, before that the second electronic device determines a time sequence of the first receiving start moment and the second receiving start moment, the second electronic device determines whether a time difference between the first receiving start moment and the second receiving start moment is less than a preset first threshold; or if a result of the determining is that the time difference is not less than the first threshold, performs the operation of determining a time sequence of the first receiving start moment and the second receiving start moment.

In a possible embodiment, that the second electronic device determines second location information based on the first receiving start moment, the second receiving start moment, and the first location information includes: The second electronic device separately obtains a first sending start moment and a second sending start moment, where the first sending start moment is a start moment when the first electronic device sends the first sound wave signal via the first sound wave transmitter, and the second sending start moment is a start moment when the second electronic device sends the second sound wave signal via the second sound wave transmitter. The second electronic device calculates a first time difference based on the first sending start moment and the first receiving start moment, and calculates a second time difference based on the second sending start moment and the second receiving start moment. The second electronic device determines a magnitude relationship between the first time difference and the second time difference. If a result of the determining is that the first time difference is greater than the second time difference, the second electronic device determines the second location information as first information, where the first information is for describing that the second electronic device is located on a left side of the first electronic device based on the angle from which the user watches the display screen of the second electronic device. If a result of the determining is that the first time difference is less than the second time difference, the second electronic device determines the second location information as second information, where the second information is for describing that the second electronic device is located on a right side of the first electronic device based on the angle from which the user watches the display screen of the second electronic device. The method provides another possible embodiment of determining the second location information.

In a possible embodiment, before that the second electronic device determines a magnitude relationship between the first time difference and the second time difference, the second electronic device determines whether a difference between the first time difference and the second time difference is less than a preset second threshold; and if a result of the determining is that the difference is not less than the second threshold, performs the operation of determining a magnitude relationship between the first time difference and the second time difference.

In a possible embodiment, that a first electronic device determines that a first trigger condition is satisfied includes: The first electronic device receives a first message sent by the second electronic device, where the first message is an acknowledgment message for a collaborative display request sent by the first electronic device. Alternatively, the first electronic device receives an interface switching operation for a display element in a collaborative display state. Alternatively, the first electronic device determines, based on received movement data in a collaborative display state, that the first electronic device has moved. Alternatively, the first electronic device receives a location information adjustment request sent by the second electronic device in a collaborative display state, where the location information adjustment request is sent after the second electronic device detects that the second electronic device has moved. Alternatively, the first electronic device determines, based on a preset periodicity in a collaborative display state, that a trigger moment of the detection of the relative location relationship is reached. The method provides a possible embodiment of determining that the first trigger condition is satisfied.

In a possible embodiment, before third location information is updated by using the second location information, the first electronic device determines whether the first location information is consistent with the second location information; and if a result of the determining is that the first location information is inconsistent with the second location information, the operation of updating second location information by using the first location information is performed.

According to a second aspect, this application provides a location information adjustment method, applied to a first electronic device, and including: determining that a first trigger condition is satisfied, where the first trigger condition is for triggering detection of a relative location relationship between the first electronic device and a second electronic device; sending a first instruction, where the first instruction is for enabling a first sound wave transmitter to send a first sound wave signal; and sending a second instruction, where the second instruction is for enabling a second sound wave transmitter to send a second sound wave signal; the first sound wave signal and the second sound wave signal have different amplitudes and/or frequencies; and the first sound wave transmitter and the second sound wave transmitter are disposed in the first electronic device; receiving second location information sent by the second electronic device, where the second location information is for describing a left-right relative location relationship between the first electronic device and the second electronic device based on an angle from which a user watches a display screen of the second electronic device; and the second location information is determined by the second electronic device based on a first receiving start moment, a second receiving start moment, and first location information, the first sound wave receiver is disposed in the second electronic device, the first receiving start moment is a start moment when a first sound wave receiver receives the first sound wave signal, the second receiving start moment is a start moment when the first sound wave receiver receives the second sound wave signal, and the first location information is for describing that the first sound wave transmitter is located on a left side of the second sound wave transmitter based on an angle from which the user watches the first electronic device; and updating third location information by using the second location information, where the third location information is for describing the left-right relative location relationship between the first electronic device and the second electronic device based on an angle from which the user watches a display screen of the first electronic device. In the method, after the first electronic device determines that the trigger condition is satisfied, detection of a physical relative location between the first electronic device and the second electronic device and update of preset third location information in the first electronic device are automatically completed without manual setting by the user, thereby improving user experience. The method may be performed by a processor of the first electronic device.

In a possible embodiment, the determining that a first trigger condition is satisfied includes: receiving a first message sent by the second electronic device, where the first message is an acknowledgment message for a collaborative display request sent by the first electronic device; or receiving an interface switching operation for a display element in a collaborative display state; or determining, based on received movement data in a collaborative display state, that the first electronic device has moved; or receiving a location information adjustment request sent by the second electronic device in a collaborative display state, where the location information adjustment request is sent after the second electronic device detects that the second electronic device has moved; or determining, based on a preset periodicity in a collaborative display state, that a trigger moment of the detection of the relative location relationship is reached.

In a possible embodiment, before the updating second location information by using the first location information, the method further includes: determining whether the second location information is consistent with the third location information; and if a result of the determining is that the second location information is inconsistent with the third location information, performing the operation of updating third location information by using the second location information.

According to a third aspect, this application provides a location information adjustment method, applied to a second electronic device, and including: sending a third instruction, where the third instruction is for enabling a first sound wave receiver to receive a first sound wave signal and a second sound wave signal, and the first sound wave receiver is disposed in the second electronic device; the first sound wave signal is sent via a first sound wave transmitter after a first electronic device determines that a first trigger condition is satisfied, the second sound wave signal is sent via a second sound wave transmitter after the first electronic device determines that the first trigger condition is satisfied, and the first trigger condition is for triggering detection of a relative location relationship between the first electronic device and the second electronic device; the first sound wave signal and the second sound wave signal have different amplitudes and/or frequencies; the first sound wave transmitter and the second sound wave transmitter are disposed in the first electronic device; and the first sound wave transmitter is located on a left side of the second sound wave transmitter based on an angle from which a user watches the first electronic device; calculating a first receiving start moment and a second receiving start moment, where the first receiving start moment is a start moment when the first sound wave receiver receives the first sound wave signal, and the second receiving start moment is a start moment when the first sound wave receiver receives the second sound wave signal; obtaining first location information, and determining second location information based on the first receiving start moment, the second receiving start moment, and the first location information, where the first location information is for describing that the first sound wave transmitter is located on the left side of the second sound wave transmitter based on the angle from which the user watches the first electronic device; and the second location information is for describing a left-right relative location relationship between the first electronic device and the second electronic device based on an angle from which the user watches a display screen of the second electronic device; and sending the second location information to the first electronic device, where the second location information is for indicating the first electronic device to update third location information by using the second location information; and the third location information is for describing the left-right relative location relationship between the first electronic device and the second electronic device based on an angle from which the user watches a display screen of the first electronic device. In the method, after the first electronic device determines that the trigger condition is satisfied, detection of a physical relative location between the first electronic device and the second electronic device and update of preset third location information in the first electronic device are automatically completed without manual setting by the user, thereby improving the user experience. The method may be performed by a processor of the second electronic device.

In a possible embodiment, sending moments of the first sound wave signal and the second sound wave signal are the same; and the determining second location information based on the first receiving start moment, the second receiving start moment, and the first location information includes: determining a time sequence of the first receiving start moment and the second receiving start moment; and if a result of the determining is that the first receiving start moment is earlier than the second receiving start moment, determining the second location information as first information, where the first information is for describing that the second electronic device is located on a left side of the first electronic device based on the angle from which the user watches the display screen of the second electronic device; or if a result of the determining is that the first receiving start moment is later than the second receiving start moment, determining the second location information as second information, where the second information is for describing that the second electronic device is located on a right side of the first electronic device based on the angle from which the user watches the display screen of the second electronic device.

In a possible embodiment, before the determining a time sequence of the first receiving start moment and the second receiving start moment, the method further includes: determining whether a time difference between the first receiving start moment and the second receiving start moment is less than a preset first threshold; and if a result of the determining is that the time difference is not less than the first threshold, the operation of determining a time sequence of the first receiving start moment and the second receiving start moment is performed.

In a possible embodiment, the determining second location information based on the first receiving start moment, the second receiving start moment, and the first location information includes: separately obtaining a first sending start moment and a second sending start moment, where the first sending start moment is a start moment when the first electronic device sends the first sound wave signal via the first sound wave transmitter, and the second sending start moment is a start moment when the second electronic device sends the second sound wave signal via the second sound wave transmitter; calculating a first time difference based on the first sending start moment and the first receiving start moment, and calculating a second time difference based on the second sending start moment and the second receiving start moment; determining a magnitude relationship between the first time difference and the second time difference; and if a result of the determining is that the first time difference is greater than the second time difference, determining the second location information as first information, where the first information is for describing that the second electronic device is located on a left side of the first electronic device based on the angle from which the user watches the display screen of the second electronic device; or if a result of the determining is that the first time difference is less than the second time difference, determining the second location information as second information, where the second information is for describing that the second electronic device is located on a right side of the first electronic device based on the angle from which the user watches the display screen of the second electronic device.

In a possible embodiment, before the determining a magnitude relationship between the first time difference and the second time difference, the method further includes: The second electronic device determines whether a difference between the first time difference and the second time difference is less than a preset second threshold; and if a result of the determining is that the difference is not less than the second threshold, performs the operation of determining a magnitude relationship between the first time difference and the second time difference.

According to a fourth aspect, this application provides a first electronic device, including: a first sound wave transmitter, a second sound wave transmitter, a receiver, and a processor, where the processor performs the following operations: determining that a first trigger condition is satisfied, where the first trigger condition is for triggering detection of a relative location relationship between the first electronic device and a second electronic device; sending a first instruction, where the first instruction is for enabling the first sound wave transmitter to send a first sound wave signal; and sending a second instruction, where the second instruction is for enabling the second sound wave transmitter to send a second sound wave signal; and the first sound wave signal and the second sound wave signal have different amplitudes and/or frequencies; obtaining second location information that is sent by the second electronic device and received by the receiver, where the second location information is for describing a left-right relative location relationship between the first electronic device and the second electronic device based on an angle from which a user watches a display screen of the second electronic device; the second location information is determined by the second electronic device based on a first receiving start moment, a second receiving start moment, and first location information, the first receiving start moment is a start moment when a first sound wave receiver receives the first sound wave signal, the second receiving start moment is a start moment when the first sound wave receiver receives the second sound wave signal, the first location information is for describing that the first sound wave transmitter is located on a left side of the second sound wave transmitter based on an angle from which the user watches the first electronic device, and the first sound wave receiver is disposed in the second electronic device; and updating third location information by using the second location information, where the third location information is for describing the left-right relative location relationship between the first electronic device and the second electronic device based on an angle from which the user watches a display screen of the first electronic device. After determining that a trigger condition is satisfied, the first electronic device automatically completes detection of a physical relative location between the first electronic device and the second electronic device and update of preset third location information in the first electronic device without manual setting by the user, thereby improving user experience.

In a possible embodiment, sending moments of the first sound wave signal and the second sound wave signal are the same; and that the second location information is determined by the second electronic device based on a first receiving start moment, a second receiving start moment, and first location information includes: The second electronic device determines a time sequence of the first receiving start moment and the second receiving start moment. If a result of the determining is that the first receiving start moment is earlier than the second receiving start moment, determines the second location information as first information, where the first information is for describing that the second electronic device is located on a left side of the first electronic device based on the angle from which the user watches the display screen of the second electronic device; or if a result of the determining is that the first receiving start moment is later than the second receiving start moment, determines the second location information as second information, where the second information is for describing that the second electronic device is located on a right side of the first electronic device based on the angle from which the user watches the display screen of the second electronic device.

In a possible embodiment, that the second location information is determined by the second electronic device based on the first receiving start moment, a second receiving start moment, and a first location information includes: The second electronic device separately obtains a first sending start moment and a second sending start moment, where the first sending start moment is a start moment when the first electronic device sends the first sound wave signal via the first sound wave transmitter, and the second sending start moment is a start moment when the second electronic device sends the second sound wave signal via the second sound wave transmitter. The second electronic device calculates a first time difference based on the first sending start moment and the first receiving start moment, and calculates a second time difference based on the second sending start moment and the second receiving start moment. The second electronic device determines a magnitude relationship between the first time difference and the second time difference. If a result of the determining is that the first time difference is greater than the second time difference, the second electronic device determines the second location information as first information, where the first information is for describing that the second electronic device is located on a left side of the first electronic device based on the angle from which the user watches the display screen of the second electronic device. If a result of the determining is that the first time difference is less than the second time difference, the second electronic device determines the second location information as second information, where the second information is for describing that the second electronic device is located on a right side of the first electronic device based on the angle from which the user watches the display screen of the second electronic device.

In a possible embodiment, that the first electronic device determines that a first trigger condition is satisfied includes: The first electronic device receives a first message sent by the second electronic device, where the first message is an acknowledgment message for a collaborative display request sent by the first electronic device. Alternatively, the first electronic device receives an interface switching operation for a display element in a collaborative display state. Alternatively, the first electronic device determines, based on received movement data in a collaborative display state, that the first electronic device has moved. Alternatively, the first electronic device receives a location information adjustment request sent by the second electronic device in a collaborative display state, where the location information adjustment request is sent after the second electronic device detects that the second electronic device has moved. Alternatively, the first electronic device determines, based on a preset periodicity in a collaborative display state, that a trigger moment of the detection of the relative location relationship is reached.

According to a fifth aspect, this application provides a second electronic device, including: a first sound wave receiver; a transmitter; and a processor, where the processor performs the following operations: sending a third instruction, where the third instruction is for enabling the first sound wave receiver to receive a first sound wave signal and a second sound wave signal, and the first sound wave receiver is disposed in the second electronic device; the first sound wave signal is sent via a first sound wave transmitter after a first electronic device determines that a first trigger condition is satisfied, the second sound wave signal is sent via a second sound wave transmitter after the first electronic device determines that the first trigger condition is satisfied, and the first trigger condition is for triggering detection of a relative location relationship between the first electronic device and the second electronic device; the first sound wave signal and the second sound wave signal have different amplitudes and/or frequencies; the first sound wave transmitter and the second sound wave transmitter are disposed in the first electronic device; and the first sound wave transmitter is located on a left side of the second sound wave transmitter based on an angle from which a user watches the first electronic device; calculating a first receiving start moment and a second receiving start moment, where the first receiving start moment is a start moment when the first sound wave receiver receives the first sound wave signal, and the second receiving start moment is a start moment when the first sound wave receiver receives the second sound wave signal; obtaining first location information, and determining second location information based on the first receiving start moment, the second receiving start moment, and the first location information, where the first location information is for describing that the first sound wave transmitter is located on the left side of the second sound wave transmitter based on the angle from which the user watches the first electronic device; and the second location information is for describing a left-right relative location relationship between the first electronic device and the second electronic device based on an angle from which the user watches a display screen of the second electronic device; and sending the second location information to the first electronic device, where the second location information is for indicating the first electronic device to update third location information by using the second location information; and the third location information is for describing the left-right relative location relationship between the first electronic device and the second electronic device based on an angle from which the user watches a display screen of the first electronic device.

In a possible embodiment, the determining that a first trigger condition is satisfied includes: receiving a first message sent by the second electronic device, where the first message is an acknowledgment message for a collaborative display request sent by the first electronic device; or receiving an interface switching operation for a display element in a collaborative display state; or determining, based on received movement data in a collaborative display state, that the first electronic device has moved; or receiving a location information adjustment request sent by the second electronic device in a collaborative display state, where the location information adjustment request is sent after the second electronic device detects that the second electronic device has moved; or determining, based on a preset periodicity in a collaborative display state, that a trigger moment of the detection of the relative location relationship is reached.

According to a sixth aspect, this application provides a computer-readable storage medium. The computer-readable storage medium stores a computer program, and when the computer program is run on a computer, the computer is enabled to perform the method according to any one of the first aspect to the third aspect.

According to a seventh aspect, this application provides a location information adjustment method, including: A first electronic device establishes a collaborative work-related connection with a second electronic device, detects a trigger condition of relative location detection, sends a first wave signal via a first wave transmitter, and sends a second wave signal via a second wave transmitter. The second electronic device receives the first wave signal and the second wave signal via a first wave receiver, determines first information based on a receiving parameter of the first wave signal and a receiving parameter of the second wave signal, and sends the first information to the first electronic device. The first electronic device adjusts location information based on the received first information, so that the location information is consistent with the first information, where the first wave signal and the second wave signal have different wave characteristics, and sending start moments of the first wave signal and the second wave signal are the same; a physical relative location between the first wave transmitter and the second wave transmitter is left and right or up and down; and the first information is for recording a physical relative location between the first electronic device and the second electronic device. In the method, in a collaborative work condition, the trigger condition of the relative location detection is detected, the first information for recording the physical relative location between the first electronic device and the second electronic device is determined, and the location information in the first electronic device is adjusted based on the first information, so that the location information set in the first electronic device involved in collaborative work can be automatically adjusted, a relative location that is between the electronic devices and is recorded by the first electronic device is consistent with the physical relative location between the electronic devices, thereby improving user experience of a collaborative function.

In a possible embodiment, that the first electronic device detects a trigger condition of relative location detection includes: The first electronic device detects that the establishment of the collaborative work-related connection with the second electronic device is completed. Alternatively, the first electronic device detects an interface switching operation for a display element in a process of collaborative display with the second electronic device. Alternatively, the first electronic device detects, in a process of collaborative display with the second electronic device, that the first electronic device has moved. Alternatively, the first electronic device receives, in a process of collaborative display with the second electronic device, a location information adjustment request sent by the second electronic device, where the location information adjustment request is sent after the second electronic device detects that the second electronic device has moved. Alternatively, the first electronic device determines, based on a preset periodicity in a process of collaborative display with the second electronic device, a trigger moment of location information adjustment is reached. In the method, location information adjustment is automatically triggered under various trigger conditions, and a user does not need to perform a manual operation, thereby further improving user experience.

In a possible embodiment, the first wave signal and the second wave signal are sound waves, and the determining first information based on a receiving parameter of the first wave signal and a receiving parameter of the second wave signal includes: determining the first information based on a receiving start moment of the first wave signal and a receiving start moment of the second wave signal. In the method, a wave signal is implemented by using a sound wave, and then the physical relative location between the first electronic device and the second electronic device is determined by using a receiving start moment of the sound wave, thereby implementing detection of the physical relative location and providing accurate reference data for location information adjustment.

In a possible embodiment, the determining the first information based on a receiving start moment of the first wave signal and a receiving start moment of the second wave signal includes: if the receiving start moment of the first wave signal is earlier than the receiving start moment of the second wave signal, the physical relative location recorded in the first information is that the second electronic device is located on a first side of the first electronic device, and the first side is a side corresponding to the first wave transmitter; and if the receiving start moment of the first wave signal is later than the receiving start moment of the second wave signal, the physical relative location recorded in the first information is that the second electronic device is located on a second side of the first electronic device, and the second side is a side corresponding to the second wave transmitter. The method provides embodiments for detecting a physical relative location based on a sound wave, thereby implementing the detection of the physical relative location between the first electronic device and the second electronic device, and providing accurate reference data for location information adjustment.

In a possible embodiment, the first wave signal and the second wave signal are Bluetooth signals or UWB signals, and the determining first information based on a receiving parameter of the first wave signal and a receiving parameter of the second wave signal includes: calculating an angle of departure based on a phase difference between the first wave signal and the second wave signal received by the first wave receiver, and determining the first information based on the angle of departure. In the method, a method for detecting a physical relative location based on a Bluetooth signal or a UWB signal is provided, thereby implementing the detection of the physical relative location between the first electronic device and the second electronic device, and providing accurate reference data for location information adjustment.

In a possible embodiment, the method further includes: The first electronic device sends a third wave signal via a third wave transmitter, where the third wave signal and the first wave signal have different wave characteristics, the third wave signal and the second wave signal have different wave characteristics, and sending start moments of the third wave signal and the first wave signal are the same. The second electronic device receives the third wave signal via the first wave receiver, where if the physical relative location between the first wave transmitter and the second wave transmitter is left and right, a physical relative location between the third wave transmitter and the first wave transmitter is up and down, or if the physical relative location between the first wave transmitter and the second wave transmitter is up and down, a physical relative location between the third wave transmitter and the first wave transmitter is left and right. The second electronic device further determines the first information based on a receiving parameter of the third wave signal. In the method, the third wave transmitter is added to send the third wave signal, so that the second electronic device may detect the physical relative location between the first electronic device and the second electronic device based on the receiving parameters of the first wave signal, the second wave signal, and the third wave signal, thereby further providing more physical relative locations that can be detected.

In a possible embodiment, that the second electronic device further determines the first information based on a receiving parameter of the third wave signal includes: determining second information based on the receiving parameter of the first wave signal and the receiving parameter of the second wave signal, determining third information based on the receiving parameter of the third wave signal and the receiving parameter of the first wave signal, and determining the first information based on the second information and the third information.

In a possible embodiment, a quantity of second electronic devices that establish a connection with the first electronic device is greater than 1, and the method further includes: The second electronic devices send preset first parameters to the first electronic device, where the preset first parameters are determined by the second electronic devices based on the receiving parameter of the first wave signal and/or the receiving parameter of the second wave signal. The first electronic device determines that at least two second electronic devices send the same first information, and determines fourth information based on the first parameters sent by the at least two second electronic devices, where the fourth information is for recording a physical relative location between the at least two second electronic devices. The first electronic device further adjusts the location information based on the fourth information. This embodiment provides a method for detecting a physical relative location between second electronic devices that have the same first information.

In a possible embodiment, the first wave signal and the second wave signal are sound waves, and the first parameter is the receiving start moment of the first wave signal and/or the receiving start moment of the second wave signal.

In a possible embodiment, the first wave signal and the second wave signal are Bluetooth signals or UWB signals, and the first parameter is the angle of departure obtained through calculation based on the phase difference between the first wave signal and the second wave signal.

According to an eighth aspect, this application provides a location information adjustment method, applied to a first electronic device, and including: establishing a collaborative work-related connection with a second electronic device, detecting a trigger condition of relative location detection, sending a first wave signal via a first wave transmitter, sending a second wave signal via a second wave transmitter, receiving first information sent by the second electronic device, and adjusting location information based on the received first information, so that the location information is consistent with the first information, where the first wave signal and the second wave signal have different wave characteristics, and sending start moments of the first wave signal and the second wave signal are the same; a physical relative location between the first wave transmitter and the second wave transmitter is left and right or up and down; and the first information is determined by the second electronic device based on a receiving parameter of the first wave signal and a receiving parameter of the second wave signal, the receiving parameter of the first wave signal and the receiving parameter of the second wave signal are obtained by the second electronic device by receiving the first wave signal and the second wave signal via a first wave receiver, and the first information is for recording a physical relative location between the first electronic device and the second electronic device.

In a possible embodiment, the detecting a trigger condition of relative location detection includes: detecting that the establishment of the collaborative work-related connection with the second electronic device is completed; or detecting an interface switching operation on a display element in a process of collaborative display with the second electronic device; or detecting, in a process of collaborative display with the second electronic device, that the first electronic device has moved; or receiving, in a process of collaborative display with the second electronic device, a location information adjustment request sent by the second electronic device, where the location information adjustment request is sent after the second electronic device detects that the second electronic device has moved; or determining, based on a preset periodicity in a process of collaborative display with the second electronic device, that a trigger moment of location information adjustment is reached.

In a possible embodiment, the method further includes: sending a third wave signal via a third wave transmitter, where the third wave signal and the first wave signal have different wave characteristics, the third wave signal and the second wave signal have different wave characteristics, and sending start moments of the third wave signal and the first wave signal are the same; the third wave signal is for enabling the second electronic device to further determine the first information based on a receiving parameter of the third wave signal; and if the physical relative location between the first wave transmitter and the second wave transmitter is left and right, a physical relative location between the third wave transmitter and the first wave transmitter is up and down, or if the physical relative location between the first wave transmitter and the second wave transmitter is up and down, a physical relative location between the third wave transmitter and the first wave transmitter is left and right.

In a possible embodiment, a quantity of second electronic devices that establish a connection with the first electronic device is greater than 1, and the method further includes: receiving preset first parameters sent by the second electronic devices, where the preset first parameters are determined by the second electronic devices based on the receiving parameter of the first wave signal and/or the receiving parameter of the second wave signal; determining that at least two second electronic devices send the same first information, and determining fourth information based on the first parameters sent by the at least two second electronic devices, where the fourth information is for recording a physical relative location between the at least two second electronic devices; and further adjusting the location information based on the fourth information, so that information that is in the location information and is for recording a relative location between the second electronic devices is consistent with the fourth information.

In a possible embodiment, the first wave signal and the second wave signal are sound waves, and the first parameter is a receiving start moment of the first wave signal and/or a receiving start moment of the second wave signal.

In a possible embodiment, the first wave signal and the second wave signal are Bluetooth signals or UWB signals, and the first parameter is an angle of departure obtained through calculation based on a phase difference between the first wave signal and the second wave signal.

According to a ninth aspect, this application provides a location information adjustment method, applied to a second electronic device, and including: establishing a collaborative work-related connection with a first electronic device, receiving, via a first wave transmitter, a first wave signal and a second wave signal that are sent by the first electronic device, determining first information based on a receiving parameter of the first wave signal and a receiving parameter of the second wave signal, and sending the first information to the first electronic device, where the first information is for indicating the first electronic device to adjust location information based on the first information, so that the location information is consistent with the first information, the first wave signal is sent by the first electronic device via the first wave transmitter after a trigger condition of relative location detection is detected, the second wave signal is sent by the first electronic device via a second wave transmitter after the trigger condition of the relative location detection is detected, the first wave signal and the second wave signal have different wave characteristics, and sending start moments of the first wave signal and the second wave signal are the same; a physical relative location between the first wave transmitter and the second wave transmitter is left and right or up and down; and the first information is for recording a physical relative location between the first electronic device and the second electronic device.

In a possible embodiment, the first wave signal and the second wave signal are sound waves, and the determining first information based on a receiving parameter of the first wave signal and a receiving parameter of the second wave signal includes: determining the first information based on a receiving start moment of the first wave signal and a receiving start moment of the second wave signal.

In a possible embodiment, the determining the first information based on a receiving start moment of the first wave signal and a receiving start moment of the second wave signal includes: if the receiving start moment of the first wave signal is earlier than the receiving start moment of the second wave signal, the physical relative location recorded in the first information is that the second electronic device is located on a first side of the first electronic device, and the first side is a side corresponding to the first wave transmitter; and if the receiving start moment of the first wave signal is later than the receiving start moment of the second wave signal, the physical relative location recorded in the first information is that the second electronic device is located on a second side of the first electronic device, and the second side is a side corresponding to the second wave transmitter.

In a possible embodiment, the first wave signal and the second wave signal are Bluetooth signals or UWB signals, and the determining first information based on a receiving parameter of the first wave signal and a receiving parameter of the second wave signal includes: calculating an angle of departure based on a phase difference between the first wave signal and the second wave signal received by the first wave receiver, and determining the first information based on the angle of departure.

In a possible embodiment, the method further includes: receiving a third wave signal via a first wave receiver, where the third wave signal is sent by the first electronic device via a third wave transmitter after the trigger condition of the relative location detection is detected, the third wave signal and the first wave signal have different wave characteristics, the third wave signal and the second wave signal have different wave characteristics, and sending start moments of the third wave signal and the first wave signal are the same; and if the physical relative location between the first wave transmitter and the second wave transmitter is left and right, a physical relative location between the third wave transmitter and the first wave transmitter is up and down, or if the physical relative location between the first wave transmitter and the second wave transmitter is up and down, a physical relative location between the third wave transmitter and the first wave transmitter is left and right; and further determining the first information based on a receiving parameter of the third wave signal.

In a possible embodiment, the further determining the first information based on a receiving parameter of the third wave signal includes: determining second information based on the receiving parameter of the first wave signal and the receiving parameter of the second wave signal, determining third information based on the receiving parameter of the third wave signal and the receiving parameter of the first wave signal, and determining the first information based on the second information and the third information.

In a possible embodiment, a quantity of second electronic devices connected to the first electronic device is greater than 1, and the method further includes: sending preset first parameters to the first electronic device, where the preset first parameters are determined by the second electronic devices based on the receiving parameter of the first wave signal and/or the receiving parameter of the second wave signal.

In a possible embodiment, the first wave signal and the second wave signal are sound waves, and the first parameter is the receiving start moment of the first wave signal and/or the receiving start moment of the second wave signal.

In a possible embodiment, the first wave signal and the second wave signal are Bluetooth signals or UWB signals, and the first parameter is the angle of departure obtained through calculation based on the phase difference between the first wave signal and the second wave signal.

According to a tenth aspect, this application provides a location information adjustment method, including: A first electronic device establishes a collaborative work-related connection with a second electronic device, and detects a trigger condition of relative location detection. The second electronic device sends a first wave signal via a first wave transmitter, and sends a second wave signal via a second wave transmitter, where the first wave signal and the second wave signal have different wave characteristics, and sending start moments of the first wave signal and the second wave signal are the same; and a physical relative location between the first wave transmitter and the second wave transmitter is left and right or up and down. The first electronic device receives the first wave signal and the second wave signal via a first wave receiver, determines first information based on a receiving parameter of the first wave signal and a receiving parameter of the second wave signal, and adjusts location information based on the first information, so that the location information is consistent with the first information, where the first information is for recording a physical relative location between the first electronic device and the second electronic device.

In a possible embodiment, that a first electronic device detects a trigger condition of relative location detection includes: The first electronic device detects that the establishment of the collaborative work-related connection with the second electronic device is completed. Alternatively, the first electronic device detects an interface switching operation for a display element in a process of collaborative display with the second electronic device. Alternatively, the first electronic device detects, in a process of collaborative display with the second electronic device, that the first electronic device has moved. Alternatively, the first electronic device receives, in a process of collaborative display with the second electronic device, a location information adjustment request sent by the second electronic device, where the location information adjustment request is sent after the second electronic device detects that the second electronic device has moved. Alternatively, the first electronic device determines, based on a preset periodicity in a process of collaborative display with the second electronic device, a trigger moment of location information adjustment is reached.

In a possible embodiment, the first wave signal and the second wave signal are sound waves, and the determining first information based on a receiving parameter of the first wave signal and a receiving parameter of the second wave signal includes: determining the first information based on a receiving start moment of the first wave signal and a receiving start moment of the second wave signal.

In a possible embodiment, the determining the first information based on a receiving start moment of the first wave signal and a receiving start moment of the second wave signal includes: if the receiving start moment of the first wave signal is earlier than the receiving start moment of the second wave signal, the physical relative location recorded in the first information is that the second electronic device is located on a first side of the first electronic device, and the first side is a side corresponding to the first wave transmitter; and if the receiving start moment of the first wave signal is later than the receiving start moment of the second wave signal, the physical relative location recorded in the first information is that the second electronic device is located on a second side of the first electronic device, and the second side is a side corresponding to the second wave transmitter.

In a possible embodiment, the first wave signal and the second wave signal are Bluetooth signals or UWB signals, and the determining first information based on a receiving parameter of the first wave signal and a receiving parameter of the second wave signal includes: calculating an angle of departure based on a phase difference between the first wave signal and the second wave signal received by the first wave receiver, and determining the first information based on the angle of departure.

In a possible embodiment, the method further includes: The second electronic device sends a third wave signal via a third wave transmitter, where the third wave signal and the first wave signal have different wave characteristics, the third wave signal and the second wave signal have different wave characteristics, and sending start moments of the third wave signal and the first wave signal are the same. The first electronic device receives the third wave signal via the first wave receiver, where if the physical relative location between the first wave transmitter and the second wave transmitter is left and right, a physical relative location between the third wave transmitter and the first wave transmitter is up and down, or if the physical relative location between the first wave transmitter and the second wave transmitter is up and down, a physical relative location between the third wave transmitter and the first wave transmitter is left and right. The first electronic device further determines the first information based on a receiving parameter of the third wave signal.

In a possible embodiment, that the first electronic device further determining the first information based on a receiving parameter of the third wave signal includes: determining second information based on the receiving parameter of the first wave signal and the receiving parameter of the second wave signal, determining third information based on the receiving parameter of the third wave signal and the receiving parameter of the first wave signal, and determining the first information based on the second information and the third information.

In a possible embodiment, a quantity of second electronic devices that establish a connection with the first electronic device is greater than 1, and the method further includes: determining that at least two second electronic devices correspond to the same first information, and determining fourth information based on preset first parameters corresponding to the at least two second electronic devices, where the preset first parameters are determined by the first electronic device based on the receiving parameter of the first wave signal and/or the receiving parameter of the second wave signal corresponding to the second electronic devices, and the fourth information is for recording a physical relative location between the at least two second electronic devices. The first electronic device further adjusts the location information based on the fourth information, so that information that is in the location information and is for recording a relative location between the second electronic devices is consistent with the fourth information.

In a possible embodiment, the first wave signal and the second wave signal are sound waves, the first parameter is a time difference of the first wave signal, and the time difference of the first wave signal is a difference between the receiving start moment and the sending start moment of the first wave signal, and/or a time difference of the second wave signal, where the time difference of the second wave signal is a difference between the receiving start moment and the sending start moment of the second wave signal.

In a possible embodiment, the first wave signal and the second wave signal are Bluetooth signals or UWB signals, and the first parameter is the angle of departure obtained through calculation based on the phase difference between the first wave signal and the second wave signal.

According to an eleventh aspect, this application provides a location information adjustment method, applied to a first electronic device, and including: establishing a collaborative work-related connection with a second electronic device, detecting a trigger condition of relative location detection, receiving a first wave signal and a second wave signal via a first wave receiver, determining first information based on a receiving parameter of the first wave signal and a receiving parameter of the second wave signal, and adjusting location information based on the first information, so that the location information is consistent with the first information, where the first wave signal is sent by the second electronic device via a first wave transmitter, the second wave signal is sent by the second electronic device via a second wave transmitter, the first wave signal and the second wave signal have different wave characteristics, and sending start moments of the first wave signal and the second wave signal are the same; a physical relative location between the first wave transmitter and the second wave transmitter is left and right or up and down; and the first information is for recording a physical relative location between the first electronic device and the second electronic device.

In a possible embodiment, the detecting a trigger condition of relative location detection includes: detecting that the establishment of the collaborative work-related connection with the second electronic device is completed; or detecting an interface switching operation on a display element in a process of collaborative display with the second electronic device; or detecting, in a process of collaborative display with the second electronic device, that the first electronic device has moved; or receiving, in a process of collaborative display with the second electronic device, a location information adjustment request sent by the second electronic device, where the location information adjustment request is sent after the second electronic device detects that the second electronic device has moved; or determining, based on a preset periodicity in a process of collaborative display with the second electronic device, that a trigger moment of location information adjustment is reached.

In a possible embodiment, the first wave signal and the second wave signal are sound waves, and the determining first information based on a receiving parameter of the first wave signal and a receiving parameter of the second wave signal includes: determining the first information based on a receiving start moment of the first wave signal and a receiving start moment of the second wave signal.

In a possible embodiment, the determining the first information based on a receiving start moment of the first wave signal and a receiving start moment of the second wave signal includes: if the receiving start moment of the first wave signal is earlier than the receiving start moment of the second wave signal, the physical relative location recorded in the first information is that the second electronic device is located on a first side of the first electronic device, and the first side is a side corresponding to the first wave transmitter; and if the receiving start moment of the first wave signal is later than the receiving start moment of the second wave signal, the physical relative location recorded in the first information is that the second electronic device is located on a second side of the first electronic device, and the second side is a side corresponding to the second wave transmitter.

In a possible embodiment, the first wave signal and the second wave signal are Bluetooth signals or UWB signals, and the determining first information based on a receiving parameter of the first wave signal and a receiving parameter of the second wave signal includes: calculating an angle of departure based on a phase difference between the first wave signal and the second wave signal received by the first wave receiver, and determining the first information based on the angle of departure.

In a possible embodiment, the method further includes: receiving a third wave signal via the first wave receiver, where the first wave signal is sent by the second electronic device via a third wave transmitter, the third wave signal and the first wave signal have different wave characteristics, the third wave signal and the second wave signal have different wave characteristics, and sending start moments of the third wave signal and the first wave signal are the same; and if the physical relative location between the first wave transmitter and the second wave transmitter is left and right, a physical relative location between the third wave transmitter and the first wave transmitter is up and down, or if the physical relative location between the first wave transmitter and the second wave transmitter is up and down, a physical relative location between the third wave transmitter and the first wave transmitter is left and right; and further determining the first information based on a receiving parameter of the third wave signal.

In a possible embodiment, the further determining the first information based on a receiving parameter of the third wave signal includes: determining second information based on the receiving parameter of the first wave signal and the receiving parameter of the second wave signal, determining third information based on the receiving parameter of the third wave signal and the receiving parameter of the first wave signal, and determining the first information based on the second information and the third information.

In a possible embodiment, a quantity of second electronic devices connected to the first electronic device is greater than 1, and the method further includes: determining that at least two second electronic devices correspond to the same first information, and determining fourth information based on preset first parameters corresponding to the at least two second electronic devices, where the preset first parameters are determined by the first electronic device based on the receiving parameter of the first wave signal and/or the receiving parameter of the second wave signal corresponding to the second electronic devices, and the fourth information is for recording a physical relative location between the at least two second electronic devices; and further adjusting the location information based on the fourth information, so that information that is in the location information and is for recording a relative location between the second electronic devices is consistent with the fourth information.

In a possible embodiment, the first wave signal and the second wave signal are sound waves, the first parameter is a time difference of the first wave signal, and the time difference of the first wave signal is a difference between the receiving start moment and the sending start moment of the first wave signal, and/or a time difference of the second wave signal, where the time difference of the second wave signal is a difference between the receiving start moment and the sending start moment of the second wave signal.

In a possible embodiment, the first wave signal and the second wave signal are Bluetooth signals or UWB signals, and the first parameter is the angle of departure obtained through calculation based on the phase difference between the first wave signal and the second wave signal.

According to a twelfth aspect, this application provides a location information adjustment method, including: A first electronic device establishes a collaborative work-related connection with a second electronic device, detects a trigger condition of relative location detection, and sends a first wave signal via a first wave transmitter. The second electronic device receives the first wave signal separately via a first wave receiver and a second wave receiver, determines first information based on a first receiving parameter of the first wave receiver for the first wave signal and a second receiving parameter of the second wave receiver for the first wave signal, and sends the first information to the first electronic device. The first electronic device adjusts location information based on the received first information, so that the location information is consistent with the first information, where the first information is for recording a physical relative location between the first electronic device and the second electronic device; and a physical relative location between the first wave receiver and the second wave receiver is left and right or up and down.

In a possible embodiment, that a first electronic device detects a trigger condition of relative location detection includes: The first electronic device detects that the establishment of the collaborative work-related connection with the second electronic device is completed. Alternatively, the first electronic device detects an interface switching operation for a display element in a process of collaborative display with the second electronic device. Alternatively, the first electronic device detects, in a process of collaborative display with the second electronic device, that the first electronic device has moved. Alternatively, the first electronic device receives, in a process of collaborative display with the second electronic device, a location information adjustment request sent by the second electronic device, where the location information adjustment request is sent after the second electronic device detects that the second electronic device has moved. Alternatively, the first electronic device determines, based on a preset periodicity in a process of collaborative display with the second electronic device, a trigger moment of location information adjustment is reached.

In a possible embodiment, the first wave signal is a sound wave; and the determining first information based on a first receiving parameter of the first wave receiver for the first wave signal and a second receiving parameter of the second wave receiver for the first wave signal includes: determining the first information based on a first receiving start moment of the first wave receiver for the first wave signal and a second receiving start moment of the second wave receiver for the first wave signal.

In a possible embodiment, the determining the first information based on a first receiving start moment of the first wave receiver for the first wave signal and a second receiving start moment of the second wave receiver for the first wave signal includes: if the first receiving start moment is earlier than the second receiving start moment, the physical relative location recorded in the first information is that the first electronic device is located on a first side of the second electronic device, and the first side is a side corresponding to the first wave receiver; and if the first receiving start moment is later than the second receiving start moment, the physical relative location recorded in the first information is that the first electronic device is located on a second side of the second electronic device, and the second side is a side corresponding to the second wave receiver.

In a possible embodiment, the first wave signal is a Bluetooth signal or a UWB signal; and the determining first information based on a first receiving parameter of the first wave receiver for the first wave signal and a second receiving parameter of the second wave receiver for the first wave signal includes: calculating an angle of arrival based on a phase difference between the first wave signal received by the first wave receiver and the first wave signal received by the second wave receiver, and determining the first information based on the angle of arrival.

In a possible embodiment, the method further includes: The second electronic device receives the first wave signal via a third wave receiver, where if the physical relative location between the first wave receiver and the second wave receiver is left and right, a physical relative location between the third wave receiver and the first wave receiver is up and down, or if the physical relative location between the first wave receiver and the second wave receiver is up and down, a physical relative location between the third wave receiver and the first wave receiver is left and right. The second electronic device further determines the first information based on a third receiving parameter of the third wave receiver for the first wave signal.

In a possible embodiment, that the second electronic device further determines the first information based on a third receiving parameter of the third wave receiver for the first wave signal includes: determining second information based on the first receiving parameter and the second receiving parameter of the first wave signal; and determining third information based on the third receiving parameter and the first receiving parameter of the first wave signal, and determining the first information based on the second information and the third information.

In a possible embodiment, a quantity of second electronic devices that establish a connection with the first electronic device is greater than 1, and the method further includes: The second electronic devices send preset first parameters to the first electronic device, where the preset first parameters are determined by the second electronic devices based on the first receiving parameter and/or the second receiving parameter of the first wave signal.

The first electronic device determines that at least two second electronic devices send the same first information, and determines fourth information based on the first parameters sent by the at least two second electronic devices, where the fourth information is for recording a physical relative location between the at least two second electronic devices. The first electronic device further adjusts the location information based on the fourth information, so that information that is in the location information and is for recording a relative location between the second electronic devices is consistent with the fourth information.

In a possible embodiment, the first wave signal and the second wave signal are sound waves, and the first parameter is a start moment when the first wave receiver receives the first wave signal and/or a start moment when the second wave receiver receives the first wave signal.

In a possible embodiment, the first wave signal and the second wave signal are Bluetooth signals or UWB signals, and the first parameter is the angle of arrival calculated based on the phase difference between the first wave signal received by the first wave receiver and the first wave signal received by the second wave receiver.

According to a thirteenth aspect, this application provides a location information adjustment method, applied to a first electronic device, including: establishing a collaborative work-related connection with a second electronic device, detecting a trigger condition of relative location detection, sending a first wave signal via a first wave transmitter, receiving first information sent by the second electronic device, and adjusting location information based on the received first information, so that the location information is consistent with the first information, where the first information is determined by the second electronic device based on a first receiving parameter of a first wave receiver for the first wave signal and a second receiving parameter of a second wave receiver for the first wave signal, and the first information is for recording a physical relative location between the first electronic device and the second electronic device; and a physical relative location between the first wave receiver and the second wave receiver is left and right or up and down.

In a possible embodiment, the detecting a trigger condition of relative location detection includes: detecting that the establishment of the collaborative work-related connection with the second electronic device is completed; or detecting an interface switching operation on a display element in a process of collaborative display with the second electronic device; or detecting, in a process of collaborative display with the second electronic device, that the first electronic device has moved; or receiving, in a process of collaborative display with the second electronic device, a location information adjustment request sent by the second electronic device, where the location information adjustment request is sent after the second electronic device detects that the second electronic device has moved; or determining, based on a preset periodicity in a process of collaborative display with the second electronic device, that a trigger moment of location information adjustment is reached.

In a possible embodiment, a quantity of second electronic devices that establish a connection with the first electronic device is greater than 1, and the method further includes: receiving preset first parameters sent by the second electronic devices, where the preset first parameters are determined by the second electronic devices based on the first receiving parameter and/or the second receiving parameter of the first wave signal; determining that at least two second electronic devices send the same first information, and determining fourth information based on the first parameters sent by the at least two second electronic devices, where the fourth information is for recording a physical relative location between the at least two second electronic devices; and further adjusting the location information based on the fourth information, so that information that is in the location information and is for recording a relative location between the second electronic devices is consistent with the fourth information.

In a possible embodiment, the first wave signal and a second wave signal are sound waves, and the first parameter is a start moment when the first wave receiver receives the first wave signal and/or a start moment when the second wave receiver receives the first wave signal.

In a possible embodiment, the first wave signal and a second wave signal are Bluetooth signals or UWB signals, and the first parameter is an angle of arrival calculated based on a phase difference between the first wave signal received by the first wave receiver and the first wave signal received by the second wave receiver.

According to a fourteenth aspect, this application provides a location information adjustment method, applied to a second electronic device, and including: establishing a collaborative work-related connection with a first electronic device, receiving a first wave signal separately via a first wave receiver and a second wave receiver, determining first information based on a first receiving parameter of the first wave receiver for the first wave signal and a second receiving parameter of the second wave receiver for the first wave signal, and sending the first information to the first electronic device, where the first information is for indicating the first electronic device to adjust location information based on the first information, so that the location information is consistent with the first information; the first wave signal is sent via a first wave transmitter after the first electronic device detects a trigger condition of relative location detection; the first information is for recording a physical relative location between the first electronic device and the second electronic device; and a physical relative location between the first wave receiver and the second wave receiver is left and right or up and down.

In a possible embodiment, the first wave signal is a sound wave; and the determining first information based on a first receiving parameter of the first wave receiver for the first wave signal and a second receiving parameter of the second wave receiver for the first wave signal includes: determining the first information based on a first receiving start moment of the first wave receiver for the first wave signal and a second receiving start moment of the second wave receiver for the first wave signal.

In a possible embodiment, the determining the first information based on a first receiving start moment of the first wave receiver for the first wave signal and a second receiving start moment of the second wave receiver for the first wave signal includes: if the first receiving start moment is earlier than the second receiving start moment, the physical relative location recorded in the first information is that the first electronic device is located on a first side of the second electronic device, and the first side is a side corresponding to the first wave receiver; and if the first receiving start moment is later than the second receiving start moment, the physical relative location recorded in the first information is that the first electronic device is located on a second side of the second electronic device, and the second side is a side corresponding to the second wave receiver.

In a possible embodiment, the first wave signal is a Bluetooth signal or a UWB signal; and the determining first information based on a first receiving parameter of the first wave receiver for the first wave signal and a second receiving parameter of the second wave receiver for the first wave signal includes: calculating an angle of arrival based on a phase difference between the first wave signal received by the first wave receiver and the first wave signal received by the second wave receiver, and determining the first information based on the angle of arrival.

In a possible embodiment, the method further includes: receiving the first wave signal via a third wave receiver, where if the physical relative location between the first wave receiver and the second wave receiver is left and right, a physical relative location between the third wave receiver and the first wave receiver is up and down, or if the physical relative location between the first wave receiver and the second wave receiver is up and down, a physical relative location between the third wave receiver and the first wave receiver is left and right; and further determining the first information based on a third receiving parameter of the third wave receiver for the first wave signal.

In a possible embodiment, the further determining the first information based on a third receiving parameter of the third wave receiver for the first wave signal includes: determining second information based on the first receiving parameter and the second receiving parameter of the first wave signal; and determining third information based on the third receiving parameter and the first receiving parameter of the first wave signal, and determining the first information based on the second information and the third information.

In a possible embodiment, a quantity of second electronic devices connected to the first electronic device is greater than 1, and the method further includes: sending preset first parameters to the first electronic device, where the preset first parameters are determined by the second electronic device based on the first receiving parameter and/or the second receiving parameter of the first wave signal.

In a possible embodiment, the first wave signal and a second wave signal are sound waves, and the first parameter is a start moment when the first wave receiver receives the first wave signal and/or a start moment when the second wave receiver receives the first wave signal.

In a possible embodiment, the first wave signal and a second wave signal are Bluetooth signals or UWB signals, and the first parameter is the angle of arrival calculated based on the phase difference between the first wave signal received by the first wave receiver and the first wave signal received by the second wave receiver.

According to a fifteenth aspect, this application provides a location information adjustment method, including: A first electronic device establishes a collaborative work-related connection with a second electronic device, and detects a trigger condition of relative location detection. The second electronic device sends a first wave signal via a first wave transmitter. The first electronic device receives the first wave signal separately via a first wave receiver and a second wave receiver, determines first information based on a first receiving parameter of the first wave receiver for the first wave signal and a second receiving parameter of the second wave receiver for the first wave signal, and adjusts location information based on the first information, so that the location information is consistent with the first information, where the first information is for recording a physical relative location between the first electronic device and the second electronic device; and a physical relative location between the first wave receiver and the second wave receiver is left and right or up and down.

In a possible embodiment, that a first electronic device detects a trigger condition of relative location detection includes: The first electronic device detects that the establishment of the collaborative work-related connection with the second electronic device is completed. Alternatively, the first electronic device detects an interface switching operation for a display element in a process of collaborative display with the second electronic device. Alternatively, the first electronic device detects, in a process of collaborative display with the second electronic device, that the first electronic device has moved. Alternatively, the first electronic device receives, in a process of collaborative display with the second electronic device, a location information adjustment request sent by the second electronic device, where the location information adjustment request is sent after the second electronic device detects that the second electronic device has moved. Alternatively, the first electronic device determines, based on a preset periodicity in a process of collaborative display with the second electronic device, a trigger moment of location information adjustment is reached.

In a possible embodiment, the first wave signal is a sound wave; and the determining first information based on a first receiving parameter of the first wave receiver for the first wave signal and a second receiving parameter of the second wave receiver for the first wave signal includes:

determining the first information based on a first receiving start moment of the first wave receiver for the first wave signal and a second receiving start moment of the second wave receiver for the first wave signal.

In a possible embodiment, the determining the first information based on a first receiving start moment of the first wave receiver for the first wave signal and a second receiving start moment of the second wave receiver for the first wave signal includes: if the first receiving start moment is earlier than the second receiving start moment, the physical relative location recorded in the first information is that the first electronic device is located on a first side of the second electronic device, and the first side is a side corresponding to the first wave receiver; and if the first receiving start moment is later than the second receiving start moment, the physical relative location recorded in the first information is that the first electronic device is located on a second side of the second electronic device, and the second side is a side corresponding to the second wave receiver.

In a possible embodiment, the first wave signal is a Bluetooth signal or a UWB signal; and the determining first information based on a first receiving parameter of the first wave receiver for the first wave signal and a second receiving parameter of the second wave receiver for the first wave signal includes: calculating an angle of arrival based on a phase difference between the first wave signal received by the first wave receiver and the first wave signal received by the second wave receiver, and determining the first information based on the angle of arrival.

In a possible embodiment, the method further includes: The first electronic device receives the first wave signal via a third wave receiver, where if the physical relative location between the first wave receiver and the second wave receiver is left and right, a physical relative location between the third wave receiver and the first wave receiver is up and down, or if the physical relative location between the first wave receiver and the second wave receiver is up and down, a physical relative location between the third wave receiver and the first wave receiver is left and right. The first electronic device further determines the first information based on a third receiving parameter of the third wave receiver for the first wave signal.

In a possible embodiment, that the first electronic device further determining the first information based on a third receiving parameter of the third wave receiver for the first wave signal includes: determining second information based on the first receiving parameter and the second receiving parameter of the first wave signal; and determining third information based on the third receiving parameter and the first receiving parameter of the first wave signal, and determining the first information based on the second information and the third information.

In a possible embodiment, a quantity of second electronic devices connected to the first electronic device is greater than 1, and the method further includes: The first electronic device determines that at least two second electronic devices correspond to the same first information, and determines fourth information based on first parameters corresponding to the at least two second electronic devices, where the first parameters are determined by the first electronic device based on the first receiving parameter and/or the second receiving parameter of the first wave signal, and the fourth information is for recording a physical relative location between the at least two second electronic devices. The first electronic device further adjusts the location information based on the fourth information, so that information that is in the location information and is for recording a relative location between the second electronic devices is consistent with the fourth information.

In a possible embodiment, the first wave signal and a second wave signal are sound waves, the first parameter is a time difference of the first wave signal, and the time difference of the first wave signal is a difference between a receiving start moment and a sending start moment of the first wave signal, and/or a time difference of the second wave signal, where the time difference of the second wave signal is a difference between a receiving start moment and a sending start moment of the second wave signal.

In a possible embodiment, the first wave signal and a second wave signal are Bluetooth signals or UWB signals, and the first parameter is the angle of arrival calculated based on the phase difference between the first wave signal received by the first wave receiver and the first wave signal received by the second wave receiver.

According to a sixteenth aspect, this application provides a location information adjustment method, applied to a first electronic device, and including: establishing a collaborative work-related connection with a second electronic device, detecting a trigger condition of relative location detection, and separately receiving a first wave signal via a first wave receiver and a second wave receiver, determining first information based on a first receiving parameter of the first wave receiver for the first wave signal and a second receiving parameter of the second wave receiver for the first wave signal, and adjusting location information based on the first information, so that the location information is consistent with the first information; the first wave signal is sent by the second electronic device via a first wave transmitter, where a physical relative location between the first wave receiver and the second wave receiver is left and right or up and down; and the first information is for recording a physical relative location between the first electronic device and the second electronic device.

In a possible embodiment, the detecting a trigger condition of relative location detection includes: detecting that the establishment of the collaborative work-related connection with the second electronic device is completed; or detecting an interface switching operation on a display element in a process of collaborative display with the second electronic device; or detecting, in a process of collaborative display with the second electronic device, that the first electronic device has moved; or receiving, in a process of collaborative display with the second electronic device, a location information adjustment request sent by the second electronic device, where the location information adjustment request is sent after the second electronic device detects that the second electronic device has moved; or determining, based on a preset periodicity in a process of collaborative display with the second electronic device, that a trigger moment of location information adjustment is reached.

In a possible embodiment, the first wave signal is a sound wave; and the determining first information based on a first receiving parameter of the first wave receiver for the first wave signal and a second receiving parameter of the second wave receiver for the first wave signal includes: determining the first information based on a first receiving start moment of the first wave receiver for the first wave signal and a second receiving start moment of the second wave receiver for the first wave signal.

In a possible embodiment, the determining the first information based on a first receiving start moment of the first wave receiver for the first wave signal and a second receiving start moment of the second wave receiver for the first wave signal includes: if the first receiving start moment is earlier than the second receiving start moment, the physical relative location recorded in the first information is that the first electronic device is located on a first side of the second electronic device, and the first side is a side corresponding to the first wave receiver; and if the first receiving start moment is later than the second receiving start moment, the physical relative location recorded in the first information is that the first electronic device is located on a second side of the second electronic device, and the second side is a side corresponding to the second wave receiver.

In a possible embodiment, the first wave signal is a Bluetooth signal or a UWB signal; and the determining first information based on a first receiving parameter of the first wave receiver for the first wave signal and a second receiving parameter of the second wave receiver for the first wave signal includes: calculating an angle of arrival based on a phase difference between the first wave signal received by the first wave receiver and the first wave signal received by the second wave receiver, and determining the first information based on the angle of arrival.

In a possible embodiment, the method further includes: receiving the first wave signal via a third wave receiver, where if the physical relative location between the first wave receiver and the second wave receiver is left and right, a physical relative location between the third wave receiver and the first wave receiver is up and down, or if the physical relative location between the first wave receiver and the second wave receiver is up and down, a physical relative location between the third wave receiver and the first wave receiver is left and right; and further determining the first information based on a third receiving parameter of the third wave receiver for the first wave signal.

In a possible embodiment, the further determining the first information based on a third receiving parameter of the third wave receiver for the first wave signal includes: determining second information based on the first receiving parameter and the second receiving parameter of the first wave signal; and determining third information based on the third receiving parameter and the first receiving parameter of the first wave signal, and determining the first information based on the second information and the third information.

In a possible embodiment, a quantity of second electronic devices that establish a connection to the first electronic device is greater than 1, and the method further includes: determining that at least two second electronic devices correspond to the same first information, and determining fourth information based on first parameters corresponding to the at least two second electronic devices, where the first parameters are determined by the first electronic device based on the first receiving parameter and/or the second receiving parameter of the first wave signal, and the fourth information is for recording a physical relative location between the at least two second electronic devices; and further adjusting the location information based on the fourth information, so that information that is in the location information and is for recording a relative location between the second electronic devices is consistent with the fourth information.

In a possible embodiment, the first wave signal and a second wave signal are sound waves, the first parameter is a time difference of the first wave signal, and the time difference of the first wave signal is a difference between a receiving start moment and a sending start moment of the first wave signal, and/or a time difference of the second wave signal, where the time difference of the second wave signal is a difference between a receiving start moment and a sending start moment of the second wave signal.

In a possible embodiment, the first wave signal and a second wave signal are Bluetooth signals or UWB signals, and the first parameter is the angle of arrival calculated based on the phase difference between the first wave signal received by the first wave receiver and the first wave signal received by the second wave receiver.

According to a seventeenth aspect, this application provides a first electronic device, including a first wave transmitter; a second wave transmitter; one or more processors; a memory; and one or more computer programs, where the one or more computer programs are stored in the memory, the one or more computer programs include instructions, and when the instructions are executed by a device, the device is enabled to perform the method according to any embodiment of the eighth aspect.

According to an eighteenth aspect, this application provides a first electronic device, including a first wave receiver; one or more processors; a memory; and one or more computer programs, where the one or more computer programs are stored in the memory, the one or more computer programs include instructions, and when the instructions are executed by a device, the device is enabled to perform the method according to any embodiment of the eleventh aspect.

According to a nineteenth aspect, this application provides a first electronic device, including a first wave transmitter; one or more processors; a memory; and one or more computer programs, where the one or more computer programs are stored in the memory, the one or more computer programs include instructions, and when the instructions are executed by a device, the device is enabled to perform the method according to any embodiment of the thirteenth aspect.

According to a twentieth aspect, this application provides a first electronic device, including a first wave receiver; a second wave receiver; one or more processors; a memory; and one or more computer programs, where the one or more computer programs are stored in the memory, the one or more computer programs include instructions, and when the instructions are executed by a device, the device is enabled to perform the method according to any embodiment of the sixteenth aspect.

According to a twenty-first aspect, this application provides a second electronic device, including a first wave receiver; one or more processors; a memory; and one or more computer programs, where the one or more computer programs are stored in the memory, the one or more computer programs include instructions, and when the instructions are executed by a device, the device is enabled to perform the method according to any embodiment of the ninth aspect.

According to a twenty-second aspect, this application provides a second electronic device, including a first wave receiver; a second wave receiver; one or more processors; a memory; and one or more computer programs, where the one or more computer programs are stored in the memory, the one or more computer programs include instructions, and when the instructions are executed by a device, the device is enabled to perform the method according to any embodiment of the fourteenth aspect.

According to a twenty-third aspect, this application provides a computer-readable storage medium. The computer-readable storage medium stores a computer program, and when the computer program is run on a computer, the computer is enabled to perform the method according to any one of the first aspect to the tenth aspect.

According to a twenty-fourth aspect, this application provides a chip system, to perform the method according to the second aspect or the third aspect.

According to a twenty-fifth aspect, this application provides a computer program, where when the computer program is executed by a computer, the computer program is used to perform the method according to any one of the seventh aspect to the sixteenth aspect.

In a possible embodiment, all or some of the programs in the twenty-fifth aspect may be stored in a storage medium packaged with the processor, or some or all of the programs may be stored in a memory not packaged with the processor.

BRIEF DESCRIPTION OF DRAWINGS

To describe the technical solutions in embodiments of the present disclosure more clearly, the following briefly describes the accompanying drawings for describing embodiments. It is clear that the accompanying drawings in the following description show merely some embodiments of the present disclosure, and a person of ordinary skill in the art may still derive other drawings from these accompanying drawings without creative efforts.

DESCRIPTION OF EMBODIMENTS

Terms used in embodiments of this application are only used to explain example embodiments of this application, but are not intended to limit this application.

For example, a system including a plurality of electronic devices performs collaborative display. The collaborative display generally means that display screens of the plurality of electronic devices jointly display one complete interface, one electronic device in the system is used as a primary device, and another electronic device is used as an extension device. A relative location in physical space, that is, a physical relative location, exists between the primary device and the extension device for collaborative display, and is related to the installation or placement of the electronic devices. To implement collaborative display, in a possible embodiment, the foregoing location information for recording the physical relative location between the electronic devices is set in the primary device. During collaborative display, the primary device divides, based on the location information, an interface that is to be collaboratively displayed, to determine an interface that is to be displayed on the primary device and an interface that is to be displayed on the extension device, and sends, to the extension device for display, data of the interface that is to be displayed on the extension device. When the relative location between the electronic devices that is recorded in the location information set in the primary device is consistent with the physical relative location between the electronic devices, a user would have good experience in collaborative display.

For example, it is assumed that electronic devices for collaborative display are a notebook computer and a portable android device (PAD), the notebook computer is a primary device, and the PAD is an extension device. If a relative location between the electronic devices recorded in location information set in the notebook computer is consistent with a physical relative location between the notebook computer and the PAD, a display of the notebook computer and a display of the PAD may present a complete visual view shown in FIG. 1. If the relative location between the electronic devices recorded in the location information set in the notebook computer is inconsistent with the physical relative location between the notebook computer and the PAD, the display of the notebook computer and the display of the PAD present visually misplaced views shown in FIG. 2, and a user has poor visual experience.

Figure 3:
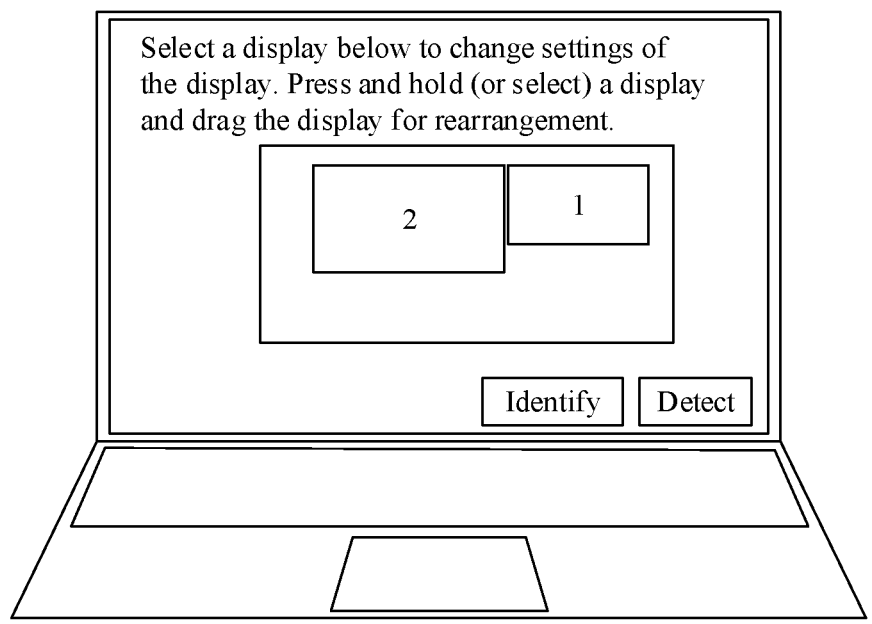
FIG. 3 is an example diagram of a location information setting interface according to an embodiment of this application.

In an example, two electronic devices are involved in collaborative display. To ensure that a relative location between the electronic devices recorded in location information set in a primary device involved in collaborative display is consistent with a physical relative location between the primary device and an extension device, a user configures, in the primary device, the relative location between the primary device and the extension device based on the physical relative location between the primary device and the extension device. FIG. 3 is an example diagram of a location information setting interface in the primary device, a display numbered 1 represents a display of the primary device, and a display numbered 2 represents a display of the extension device. The user may set a relative location between the two displays by selecting one display and dragging the display. After the user completes the setting, the primary device may obtain corresponding location information based on the relative location between the two displays set by the user. However, in this manner of setting the location information, it is a complex and cumbersome task for a common user to find the setting interface shown in FIG. 3 in an operating system of the primary device and set the relative location between the two displays. Every time the physical relative location between the primary device and the extension device is changed, the location information may be set again in the primary device, which further increases operation complexity and affects user experience.

Therefore, embodiments of this application provide a location information adjustment method and an electronic device, so that location information set in a primary device can be automatically adjusted, and a user does not need to manually set the location information, thereby improving user experience.

Figure 1:
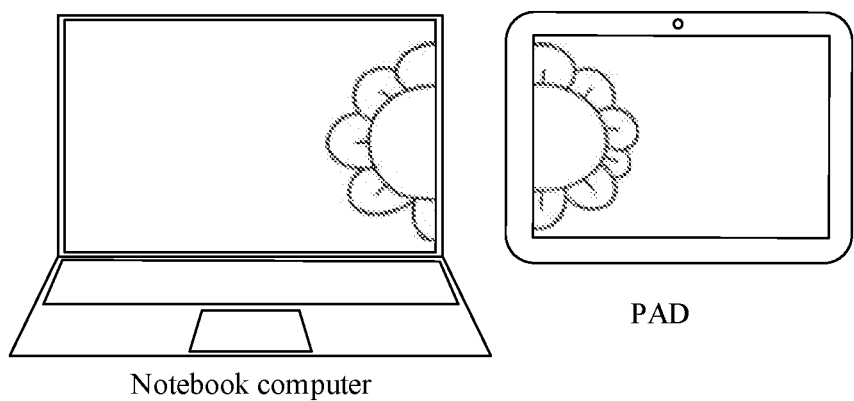
FIG. 1 is an example diagram of a collaborative display interface according to an embodiment of this application.
Figure 2:
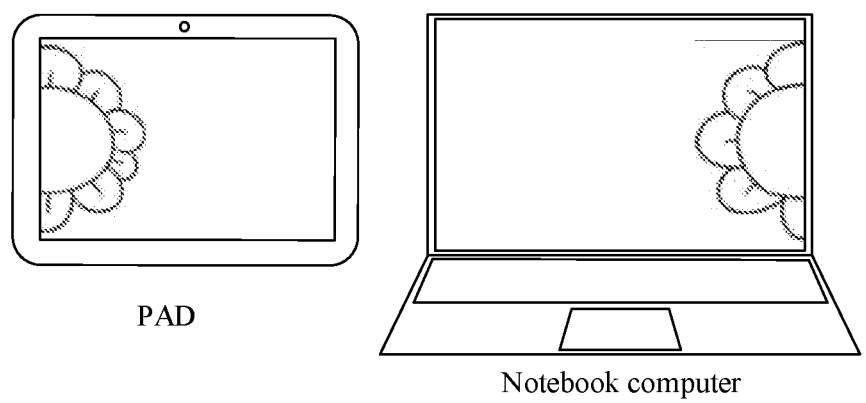
FIG. 2 is another example diagram of a collaborative display interface according to an embodiment of this application.

An example in which electronic devices involved in collaborative display are a notebook computer and a PAD is still used. When location information set in the notebook computer is consistent with a physical relative location between the notebook computer and the PAD, in addition to that a visual effect of a user is affected in static display, for example, as shown in FIG. 1 and FIG. 2, an effect that the user drags elements such as a window, a text, or a picture across display screens based on a visual orientation is affected.

Figure 4A:
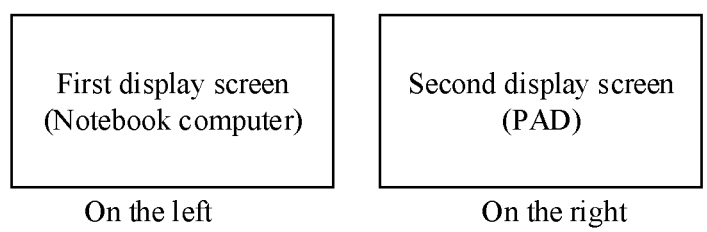
FIG. 4A is an example diagram of a physical relative location according to an embodiment of this application.
Figure 4B:
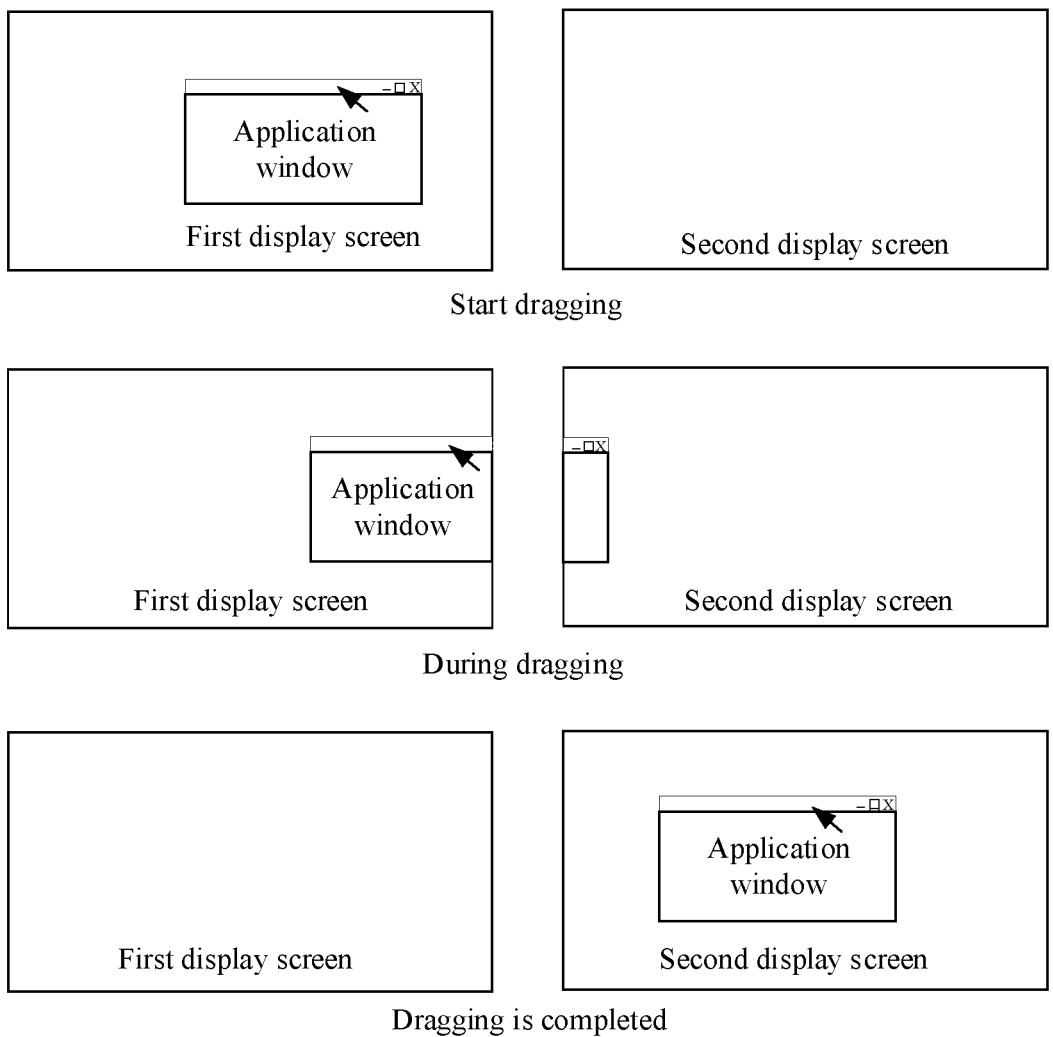
FIG. 4B is still another example diagram of a collaborative display interface according to an embodiment of this application.

Referring to FIG. 4A, it is assumed that a physical relative location between a display of the notebook computer and a display of the PAD is that the notebook computer is located on the left and the PAD is located on the right, and a relative location recorded in location information set in the notebook computer used as a primary device is consistent with the physical relative location in FIG. 4A. If an application window is displayed on a display screen of the notebook computer, and the user wants to drag the window from the display screen of the notebook computer located on the left to a display screen of the PAD located on the right, a visual feedback effect shown in FIG. 4B appears on the display screen of the notebook computer and the display screen of the PAD, and the visual feedback effect is consistent with an expectation of the user. The user has natural visual experience.

Figure 5A:
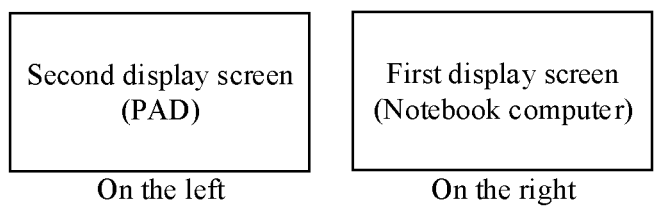
FIG. 5A is another example diagram of a physical relative location according to an embodiment of this application.
Figure 5B:
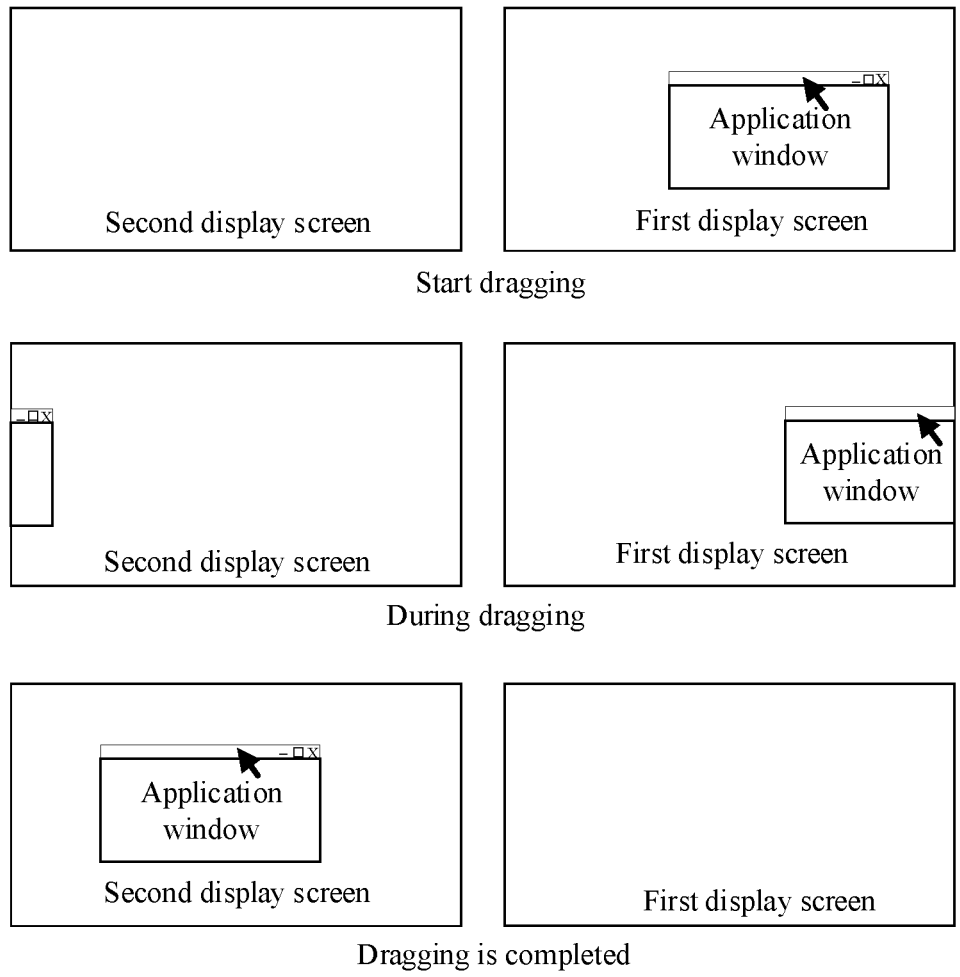
FIG. 5B is still another example diagram of a collaborative display interface according to an embodiment of this application.

The physical relative location between the display of the notebook computer and the display of the PAD is changed from that the notebook computer is located on the left and the PAD is located on the right shown in FIG. 4A to that the PAD is located on the left and the notebook computer is located on the right shown in FIG. 5A. The relative location recorded in the location information set in the notebook computer is inconsistent with the physical relative location in FIG. 5A. The relative location recorded in the location information is still that the notebook computer is located on the left and the PAD is located on the right. In this case, if an application window is displayed on the display screen of the notebook computer, and the user wants to drag the window from the display screen of the notebook computer located on the left to the display screen of the PAD located on the right, a visual feedback effect shown in FIG. 5B appears on the display screen of the notebook computer and the display screen of the PAD. This visual feedback effect is inconsistent with the expectation of the user, and the user has very poor visual experience.

For portable electronic devices such as a notebook computer and a PAD, a physical relative location may easily change. Therefore, if the electronic devices can automatically adjust location information set in a primary device, visual experience and use experience of a user on collaborative display can be greatly improved.

The location information adjustment method in embodiments of this application is applicable to a collaborative display scenario and may be further extended to another possible multi-electronic device collaboration scenario, for example, a scenario in which loudspeakers of a plurality of electronic devices form a multi-loudspeaker stereo system and play sound collaboratively. In this scenario, location information may be set in a primary device, and the primary device determines sound channel parameters of the loudspeaker in the electronic devices based on a physical relative location between the electronic devices that is recorded in the location information.

The method provided in embodiments of this application may be applied to an electronic device, for example, a notebook computer, a PAD, a personal computer (PC), a smart screen, or a mobile phone.

Figure 6:
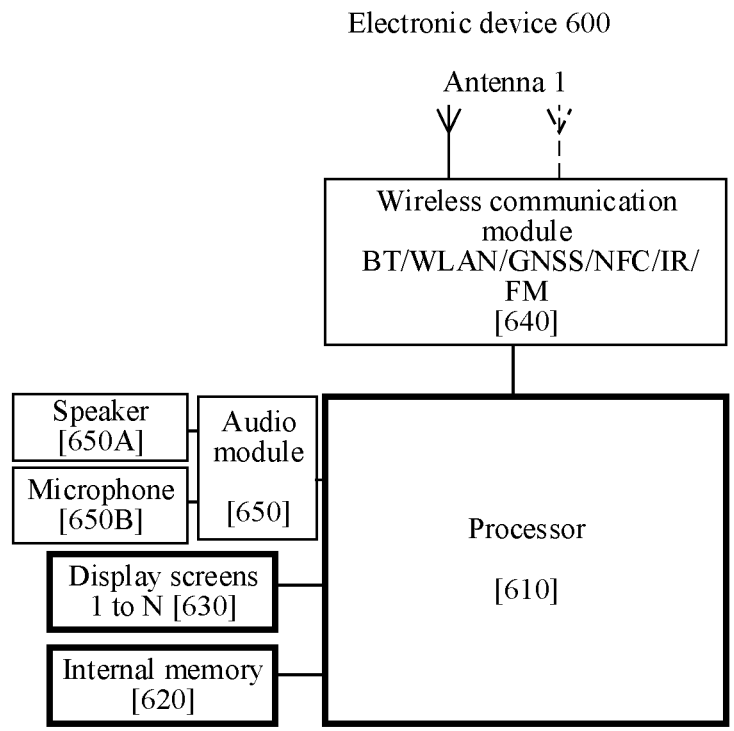
FIG. 6 is a schematic diagram of a structure of an electronic device according to an embodiment of this application.

For example, FIG. 6 is a schematic diagram of a structure of an electronic device 600. The electronic device 600 may include a processor 610, an internal memory 620, and a display screen 630. In some embodiments, the electronic device 600 may further include: an antenna 1, a wireless communication module 640, an audio module 650, a speaker 650A, a microphone 650B, and the like.

It may be understood that the structure shown in embodiments of the present disclosure does not constitute a specific limitation on the electronic device 600. In some other embodiments of this application, the electronic device 600 may include more or fewer components than those shown in the figure, combine some components, split some components, or have different component arrangements. The components shown in the figure may be implemented by using hardware, software, or a combination of software and hardware.

The processor 610 may include one or more processing units. For example, the processor 610 may include an application processor (AP), a modem processor, a graphics processing unit (GPU), an image signal processor ISP), a controller, a video codec, a digital signal processor (DSP), a baseband processor, a neural-network processing unit (NPU), and/or the like. Different processing units may be independent devices, or may be integrated into one or more processors.

The controller may generate an operation control signal based on an instruction operation code and a time sequence signal, to complete control of instruction fetching and instruction execution.

A memory may be further disposed in the processor 610, and is configured to store instructions and data. In some embodiments, the memory in the processor 610 is a cache. The memory may store instructions or data that has been used or is cyclically used by the processor 610. If the processor 610 is to use the instructions or the data again, the processor may directly invoke the instructions or the data from the memory. This avoids repeated access and reduces waiting time of the processor 610, thereby improving system efficiency.

The internal memory 620 may be configured to store computer-executable program code. The executable program code includes instructions. The internal memory 620 may include a program storage area and a data storage area. The program storage area may store an operating system, an application required by at least one function (for example, a sound playing function or an image playing function), and the like. The data storage area may store data (such as audio data and an address book) and the like that are created during use of the electronic device 600. In addition, the internal memory 620 may include a high-speed random access memory, and may further include a nonvolatile memory, for example, at least one magnetic disk storage device, a flash memory device, or a universal flash storage (UFS). The processor 610 runs instructions stored in the internal memory 620 and/or instructions stored in the memory disposed in the processor, to perform various function applications and data processing of the electronic device 600.

A wireless communication function of the electronic device 600 may be implemented by using the antenna 1, the wireless communication module 640, the modem processor, the baseband processor, and the like.

The antenna 1 is configured to transmit and receive an electromagnetic wave signal. Each antenna in the electronic device 600 may be configured to cover one or more communication frequency bands. Different antennas may be further multiplexed, to improve antenna utilization. For example, the antenna 1 may be multiplexed as a diversity antenna in a wireless local area network. In some other embodiments, an antenna may be used in combination with a tuning switch.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The baseband processor processes the low-frequency baseband signal, and then transfers an obtained signal to the application processor. The application processor outputs a sound signal by an audio device (which is not limited to the speaker 650A or the like), or displays an image or a video by the display screen 630. In some embodiments, the modem processor may be an independent component. In some other embodiments, the modem processor may be independent of the processor 610, and is disposed in a same device as another functional module.

The wireless communication module 640 may provide a wireless communication solution that is applied to the electronic device 600, and that includes a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, or the like. The wireless communication module 640 may be one or more components integrating at least one communications processor module. The wireless communication module 640 receives an electromagnetic wave through the antenna 1, performs frequency modulation and filtering processing on an electromagnetic wave signal, and sends a processed signal to the processor 610. The wireless communication module 640 may further receive a to-be-sent signal from the processor 610, perform frequency modulation and amplification on the signal, and convert the signal into an electromagnetic wave for radiation through the antenna 1.

The electronic device 600 may implement a display function through the GPU, the display screen 630, the application processor, and the like. The GPU is a microprocessor for image processing, and is connected to the display screen 630 and the application processor. The GPU is configured to: perform mathematical and geometric calculation, and render an image. The processor 610 may include one or more GPUs that execute program instructions to generate or change display information.

The display screen 630 is configured to display an image, a video, or the like. In some embodiments, the electronic device 600 may include one or N display screens 630, where N is a positive integer greater than 1.

The electronic device 600 may implement an audio function such as music playing and sound recording by using the audio module 650, the speaker 650A, the microphone 650B, the application processor, and the like.

The audio module 650 is configured to convert digital audio information into an analog audio signal output, and is also configured to convert an analog audio input into a digital audio signal. The audio module 650 may be further configured to: code and decode an audio signal. In some embodiments, the audio module 650 may be disposed in the processor 610, or some functional modules of the audio module 650 are disposed in the processor 610.

The speaker 650A, also referred to as a "loudspeaker", is configured to convert an audio electrical signal into a sound signal. The electronic device 600 may play music or answer a hands-free call by using the speaker 650A.

The microphone 650B, also referred to as a "mike" or a "mic", is configured to convert a sound signal into an electrical signal. At least one microphone 650B may be disposed in the electronic device 600. In some other embodiments, two microphones 650B may be disposed in the electronic device 600, to collect a sound signal and implement a noise reduction function. In some other embodiments, three, four, or more microphones 650B may alternatively be disposed in the electronic device 600, to collect a sound signal, implement noise reduction, and identify a sound source, to implement a directional recording function and the like.

A software system of the electronic device 600 may use a layered architecture, an event-driven architecture, a microkernel architecture, a micro service architecture, or a cloud architecture. For example, if the electronic device 600 is a PC, a PAD, or the like, the software system may be a Windows system, a MAC OS system, an iOS system, a HarmonyOS of a distributed microkernel architecture, or the like. If the electronic device 600 is a mobile phone, the software system may be an Android system of a layered architecture.

For ease of understanding, in the following embodiments of this application, an electronic device having a structure shown in FIG. 6 is used as an example to describe the method provided in embodiments of this application with reference to the accompanying drawings and application scenarios.

The following terms are used in embodiments of this application: a physical relative location, second location information, and third location information. The following provides descriptions.

The physical relative location is a relative location between electronic devices in physical space.

The second location information is information that is obtained by the electronic devices by detecting the physical relative location between the electronic devices and that is for describing the physical relative location between the electronic devices.

The third location information is a location information parameter that may be set in the electronic devices. The third location information is also for describing a physical relative location between the electronic devices. For example, in FIG. 3, the location information set by the user on the location information setting interface is the third location information. It can be learned from the location information setting interface shown in FIG. 3 that the third location information is set based on an angle from which the user simultaneously views display interfaces of the two display screens when the display screens of the two electronic devices are in a same plane.

An objective of location information adjustment in embodiments of this application is to automatically adjust the third location information, so that the third location information is consistent with the physical relative location between the electronic devices. Therefore, alternatively, the physical relative location and the second location information in embodiments of this application may be set based on an angle from which the user simultaneously views the display interfaces of the display screens when the display screens of the electronic devices are in a same plane. Based on this, referring to FIG. 7, an example in which the two electronic devices are respectively a PAD and a notebook computer is still used. The notebook computer is used as a reference object, and a physical relative location of the PAD relative to the notebook computer may include that the PAD is located on an upper side, a lower side, a left side, a right side, an upper left side, a lower left side, an upper right side, a lower right side, or the like of the notebook computer. Correspondingly, the second location information is for describing the foregoing physical relative location. For example, referring to FIG. 7, from a perspective of a user, the PAD is on the right side of the notebook computer. In this case, the physical relative location between the PAD and the notebook computer in embodiments of this application is that the PAD is on the right side of the notebook computer. Correspondingly, information that may be described in the second location information is that the PAD is on the right side of the notebook computer. The physical relative location between the electronic devices and the correspondingly obtained second location information are not related to coordinate systems established inside the notebook computer and the PAD.

How the electronic device, for example, the foregoing PC or PAD, records the physical relative location between the electronic devices by using the second location information, for example, that the PAD is on the right side of the notebook computer, is not limited in embodiments of this application. In a possible embodiment, for a pair of electronic devices, assuming that an electronic device A is on the left side of an electronic device B, the second location information may be: ((the electronic device A, the left side) (the electronic device B, the right side)). In an actual application, different binary codes may be assigned to different physical relative locations, for example, the upper side is 000, the lower side is 001, the left side is 010, the right side is 011, and so on. In this case, for the physical relative location that the PAD is on the right side of the notebook computer, the second location information may be ((the electronic device A, 010) (electronic device B, 011)).

To more conveniently adjust the third location information by using the second location information, a manner of representing the physical relative location between the electronic devices by using the second location information may be consistent with a manner of representing the physical relative location between the electronic devices by using the third location information that is set in the electronic device.

The location information adjustment method in embodiments of this application is applicable to a system that includes several electronic devices and in which location information between electronic devices may be set in at least one electronic device. Electronic devices in the system may have a primary-secondary relationship, or may not have a primary-secondary relationship. This is not limited in embodiments of this application.

Figure 8:
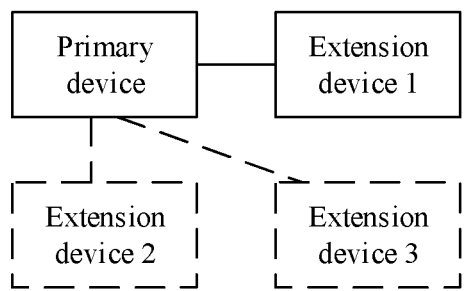
FIG. 8 is an example diagram of a system structure to which a location information adjustment method is applicable according to an embodiment of this application.

Collaborative display of the foregoing two electronic devices is still used as an example. In this case, generally, one electronic device is used as a primary device, one electronic device is used as an extension device, and the primary device is connected to the extension device to perform data transmission. The connection between the primary device and the extension device may be a wired connection or a wireless connection. If the connection is a wireless connection, a connection manner may be, for example, Wi-Fi or Bluetooth. This is not limited in embodiments of this application. In some embodiments, a quantity of extension devices in the foregoing system architecture may be further extended from one extension device to a plurality of extension devices. In this case, the primary device may be connected to the plurality of extension devices, and the primary device is separately connected to each extension device for data transmission. For example, in FIG. 8, in addition to being connected to an extension device 1, the primary device may further be connected to an extension device 2 and an extension device 3.

In collaborative display, generally, three phases are performed, which are respectively a collaborative display connection establishment phase, a location information adjustment phase, and a collaborative display phase.

Figure 9:
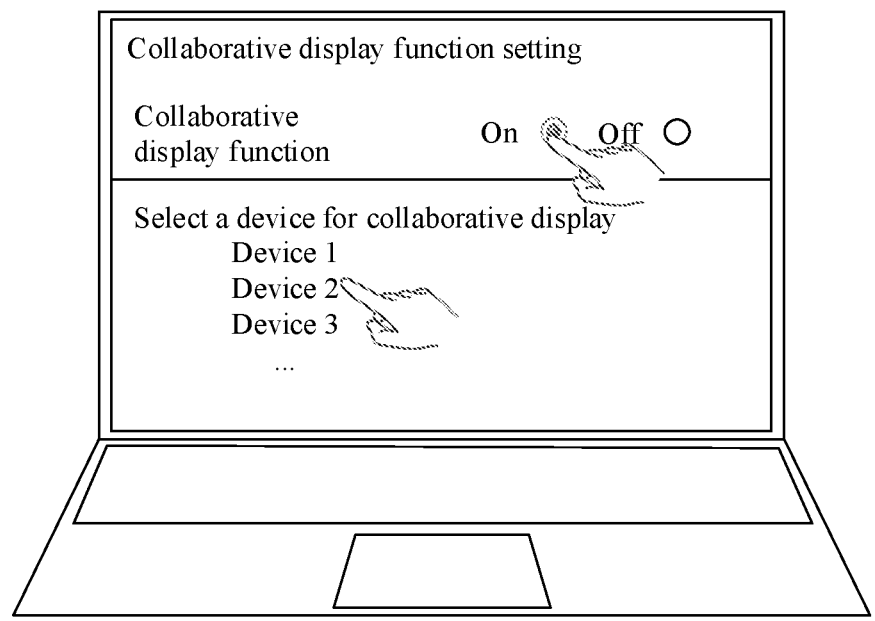
FIG. 9 is an example diagram of an interface for starting a collaborative display function according to an embodiment of this application.

In the collaborative display connection establishment phase, as shown in FIG. 9, a user may open a collaborative display function setting interface of a primary device (a notebook computer is used as an example in FIG. 9) to enable a collaborative display function. The primary device detects an operation of enabling the collaborative display function by the user, searches for a peripheral device, and displays a device list to the user. For example, a total of three devices are listed in FIG. 9: devices 1 to 3. The user selects a required extension device. The primary device detects a selection operation of the user, and establishes a collaborative display-based connection with a device indicated by the selection operation of the user. The connection may be used for transmitting data between the primary device and the extension device, for example, data that is to be transmitted in a process of performing the location information adjustment method in embodiments of this application, and the primary device transmits interface data for collaborative display to the extension device.

After the establishment of a collaborative display connection is completed, the primary device may trigger execution of the location information adjustment method in embodiments of this application, automatically detect a physical relative location between electronic devices to obtain second location information, and adjust, based on the second location information, third location information set in the primary device. Therefore, the physical relative location between the electronic devices that is recorded in the third location information is consistent with an actual physical relative location between the electronic devices.

After the establishment of the collaborative display connection is completed, the primary device enters the collaborative display phase. In this case, both the primary device and the extension device are in a collaborative display state. The primary device may divide, based on the third location information, an interface that is to be collaboratively displayed, and determine an interface that is to be displayed on each electronic device. The primary device sends interface data that is to be displayed on an extension device to the corresponding extension device. The primary device and the extension device display the collaboratively displayed interface, to implement collaborative display, as shown in FIG. 1.

It should be noted that, in the collaborative display phase, the physical relative location between the electronic devices may also change. Therefore, in the collaborative display phase, the primary device may trigger execution of the location information adjustment method in embodiments of this application, to automatically detect the physical relative location between the electronic devices, to obtain second location information. When the third location information in the primary device is inconsistent with the second location information, the third location information set in the primary device is adjusted by using the second location information, to ensure that the third location information is consistent with the second location information, that is, consistent with the physical relative location between the electronic devices.

A possible scenario in which execution of the location information adjustment method in embodiments of this application may be triggered is described below by using an example.

Scenario 1: The primary device enables a collaborative display function, and triggers execution of the location information adjustment method in embodiments of this application in a phase of establishing a connection with the extension device. For example, if the connection between the primary device and the extension device is established by sending, by the primary device, a collaborative display request to the extension device, and the extension device feeds back an acknowledgment message for the collaborative display request. The foregoing acknowledgment message received by the primary device may trigger execution of the location information adjustment method.

Figure 10:
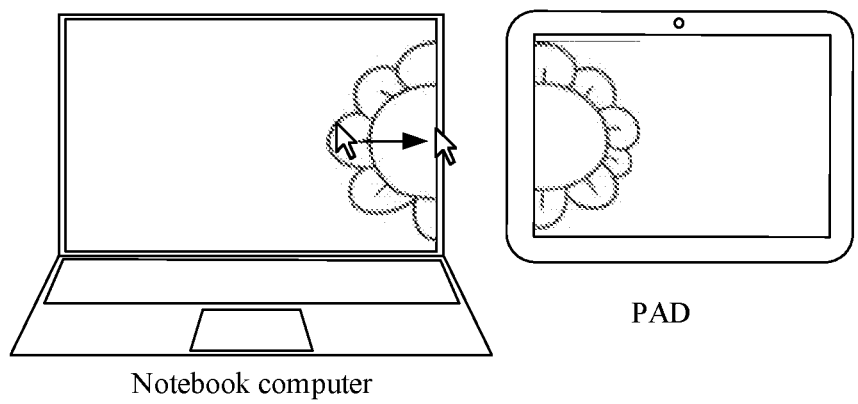
FIG. 10 is still another example diagram of a collaborative display interface according to an embodiment of this application.

Scenario 2: After the primary device and the extension device start to perform collaborative display, the primary device triggers, based on a specified operation of the user on the collaborative display interface, for example, execution of the location information adjustment method in embodiments of this application. The interface switching operation performed by the user for the display element includes but is not limited to that: the user operates a mouse to switch from a collaborative display interface of one electronic device to a collaborative display interface of another electronic device, as shown in FIG. 10; the user drags a dialog box to switch from a collaborative display interface of one electronic device to a collaborative display interface of another electronic device; and the like.

Figure 11:
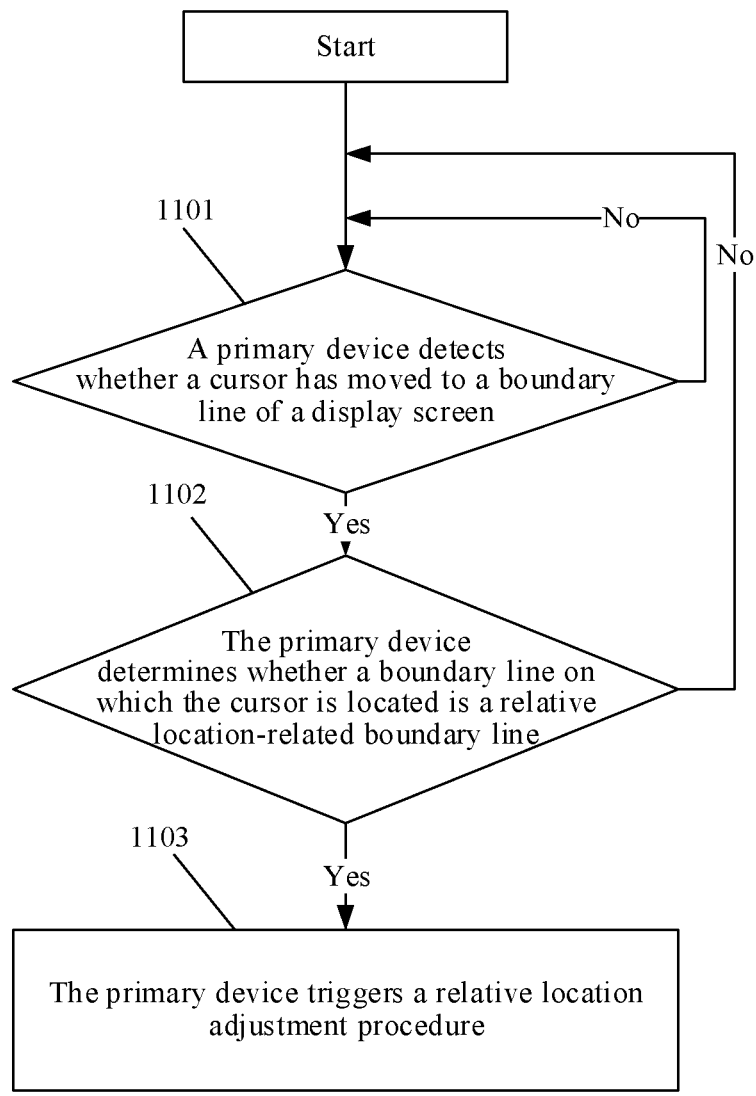
FIG. 11 is a schematic flowchart of triggering detection according to an embodiment of this application.

In this case, the primary device performs the following processing procedure shown in FIG. 11, to detect whether a location information adjustment procedure in embodiments of this application is triggered.

Operation 1101: The primary device detects whether a cursor has moved to a boundary line of a display screen, and if the cursor has moved to the boundary line, performs operation 1102, or if the cursor has not moved to the boundary line, returns to continue to perform the detection in operation 1101.

That the cursor has moved to the boundary line of the display screen may be implemented by the user performing a mouse movement operation or may be implemented by dragging a window by using a mouse. This is not limited in embodiments of this application.

Operation 1102: The primary device determines whether a boundary line on which the cursor is located is a relative location-related boundary line, and if the boundary line on which the cursor is located is a relative location-related boundary line, performs operation 1103, or if the boundary line on which the cursor is located is not a relative location-related boundary line, continues to perform the detection in operation 1101.

The relative location-related boundary line is related to the relative location between the electronic devices recorded in the third location information. If the relative location between the electronic devices recorded in the third location information set in the primary device is only left or right, the relative location-related boundary line is a left boundary line or a right boundary line of the collaborative display interface. If the relative location between the electronic devices recorded in the third location information set in the primary device is only top or bottom, the relative location-related boundary line is a top boundary line or a bottom boundary line of the collaborative display interface. If the relative location between the electronic devices recorded in the third location information set in the primary device includes top, bottom, left, right, and the like, the relative location-related boundary line includes four boundary lines: a top boundary line, a bottom boundary line, a left boundary line, and a right boundary line of the collaborative display interface.

Operation 1103: The primary device triggers a location information adjustment procedure.

Figure 12A:
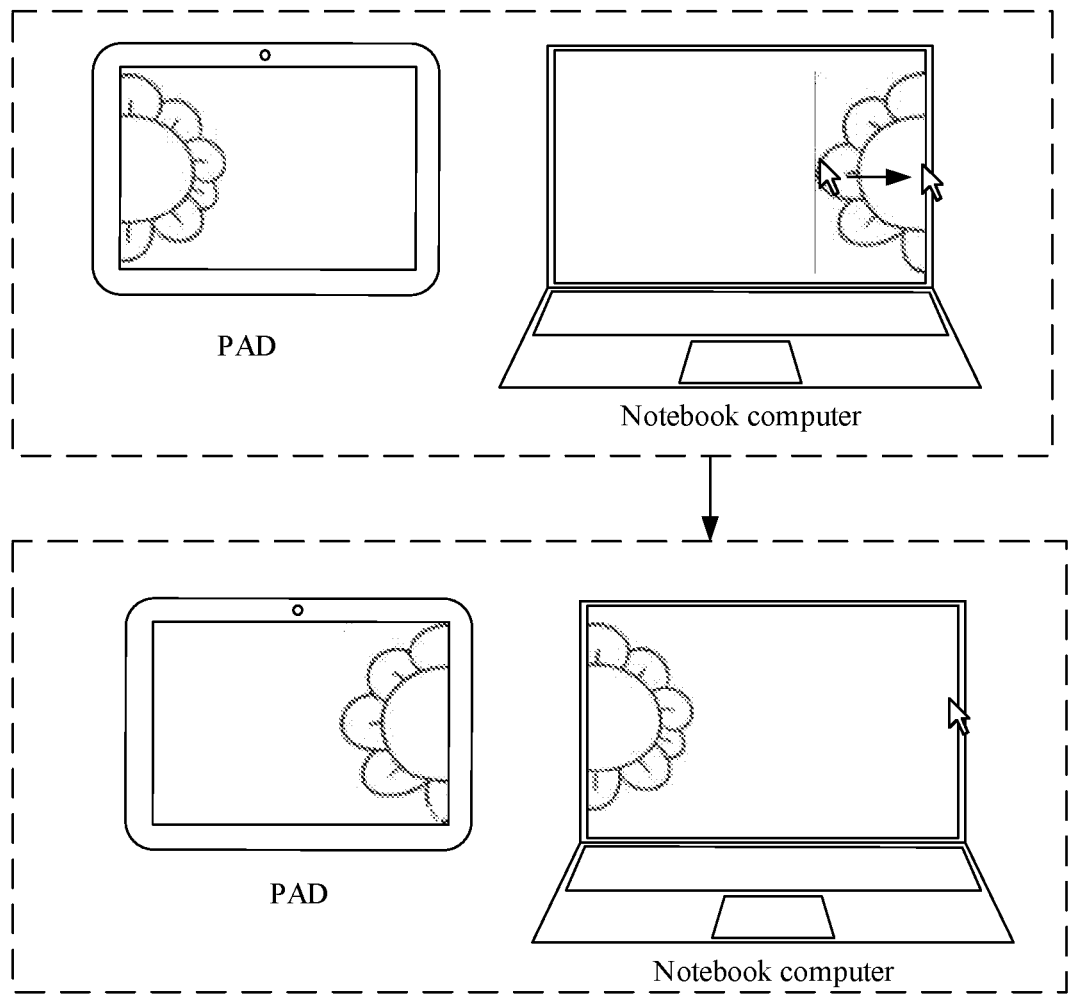
FIG. 12A is an example diagram of a collaborative display interface before and after location information is adjusted according to an embodiment of this application.

If the primary device has adjusted the third location information, an interface that is to be displayed on each electronic device is determined again based on the adjusted third location information, and the interface data for collaborative display is sent to the extension device. The primary device and the extension device perform interface display based on the new interface data, as shown in FIG. 12A.

Scenario 3: After the primary device and the extension device start collaborative display, after detecting that the primary device or the extension device has moved, the primary device or the extension device triggers execution of the location information adjustment method in embodiments of this application.

Figure 12B:
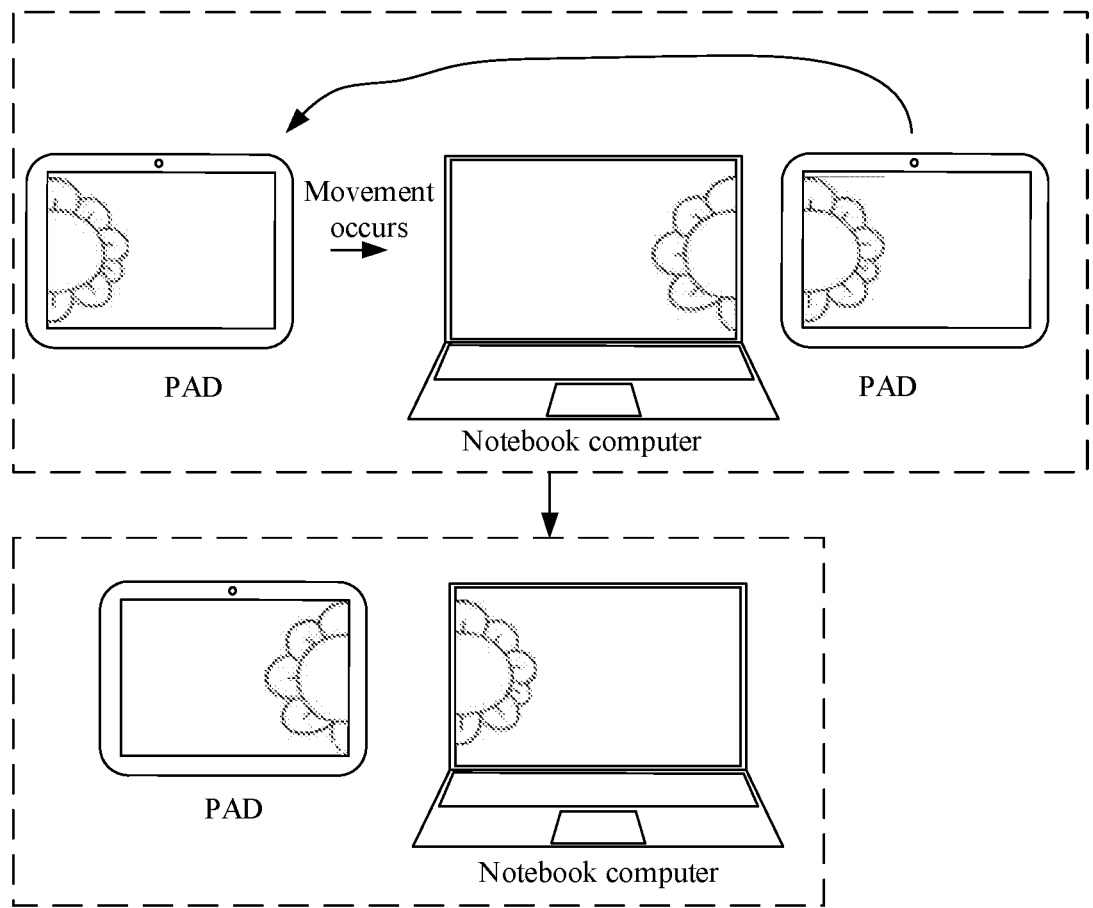
FIG. 12B is an example diagram of a scenario in which location information adjustment is triggered when an extension device detects that the extension device has moved according to an embodiment of this application.

After detecting that the extension device has moved, the extension device may notify the primary device, and the primary device triggers execution of the location information adjustment method in embodiments of this application, as shown in FIG. 12B.

The primary device or the extension device may detect whether the primary device or the extension device has moved by using data of a gyroscope and/or an acceleration sensor disposed inside the primary device or the extension device. For example, if the acceleration sensor in the primary device detects that an amplitude of an acceleration curve exceeds a preset threshold, it may be determined that the primary device has moved.

Scenario 4: After the primary device and the extension device start collaborative display, the primary device periodically triggers, based on a preset periodicity, execution of the location information adjustment method in embodiments of this application, to achieve an objective of dynamically adjusting the third location information. It should be noted that when the primary device periodically triggers execution of the location information adjustment method in embodiments of this application, when the preset periodicity is shorter, the power consumption of the primary device and the extension device is higher, and when the preset periodicity is longer, the power consumption of the primary device and the extension device is lower. In addition, if a wave transmitted in the location information adjustment method in embodiments of this application is an ultrasonic wave, if the preset periodicity is short, noise interference may be generated on an animal in a use environment, for example, a pet such as a cat or a dog in a home environment. Therefore, short-time use is generally recommended in this application scenario.

The following describes an embodiment of the location information adjustment method in this application by using an example.

Figure 13:
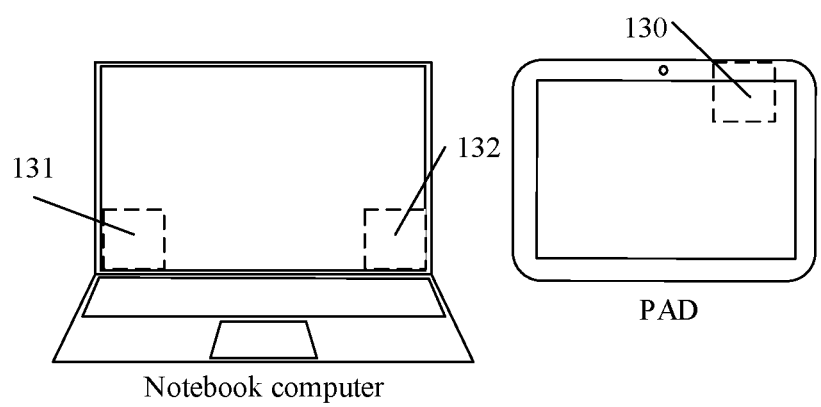
FIG. 13 is a system architectural diagram of an embodiment of a location information adjustment method according to this application.

FIG. 13 is a system architectural diagram of an embodiment of a location information adjustment method according to this application. The method includes a primary device and an extension device. The primary device includes two wave transmitters: a first wave transmitter 131 and a second wave transmitter 132. A physical relative location relationship between the first wave transmitter 131 and the second wave transmitter 132 is a left and right location relationship, that is, one of the first wave transmitter 131 and the second wave transmitter 132 is located on the left and the other is located on the right, for example, in FIG. 13, the first wave transmitter 131 is located on the left side of the second wave transmitter 132, and the second wave transmitter 132 is located on the right side of the first wave transmitter 131. Specifically, in FIG. 13, the first wave transmitter 131 is disposed on the left side of the primary device, and the second wave transmitter 132 is disposed on the right side of the primary device. A first wave receiver 130 is disposed in the extension device.

In a possible embodiment, the first wave transmitter and the second wave transmitter may be loudspeakers, the loudspeakers may emit sound waves, and the sound waves emitted by the loudspeakers may be sound waves that can be heard by human ears, or may be ultrasonic waves, preferably ultrasonic waves. The sound waves emitted by the first wave transmitter and the second wave transmitter may have different sound wave characteristics, and the sound wave characteristics may be frequency, amplitude, and/or the like. The first wave receiver may be a microphone, and is configured to receive sound waves emitted by the loudspeakers.

In another possible embodiment, the first wave transmitter, the second wave transmitter, and the first wave receiver may be Bluetooth antennas of a Bluetooth module, and wave signals sent by the first wave transmitter and the second wave transmitter may be Bluetooth signals, and are electromagnetic waves. The electromagnetic waves emitted by the first wave transmitter and the second wave transmitter have different electromagnetic wave characteristics, and the electromagnetic wave characteristics may include a phase, an amplitude, and/or the like. It should be noted that, if the first wave transmitter and the second wave transmitter are Bluetooth antennas, a distance between the first wave transmitter and the second wave transmitter is generally less than a wavelength of a Bluetooth signal.

In still another possible embodiment, the first wave transmitter, the second wave transmitter, and the first wave receiver may be antennas of an ultra wide band (UWB) module, and wave signals sent by the first wave transmitter and the second wave transmitter may be UWB signals, which are radio carriers. The radio carriers sent by the first wave transmitter and the second wave transmitter have different radio carrier characteristics, and the radio carrier characteristics may include a phase, an amplitude, and/or the like.

Figure 14A:
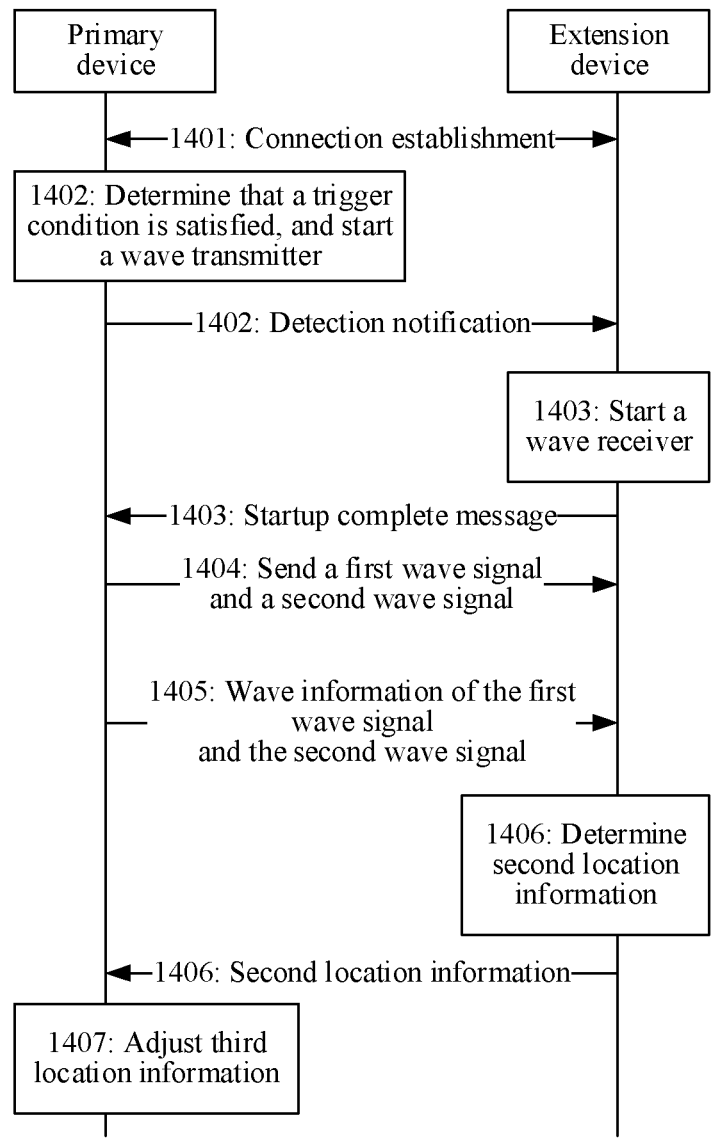
FIG. 14A is a flowchart of an embodiment of a location information adjustment method according to this application.

FIG. 14A is a flowchart of an embodiment of a location information adjustment method in the system architecture shown in FIG. 13. As shown in FIG. 14A, the method includes the following operations.

Operation 1401: Establish a collaborative display-related connection between the primary device and the extension device.

For an example of this operation, refer to FIG. 9. Details are not described herein again.

How to establish a connection between the primary device and the extension device is not limited in embodiments of this application.

Operation 1402: The primary device determines that a trigger condition of relative location detection is satisfied, starts the first wave transmitter and the second wave transmitter, and instructs the extension device to start relative location detection.

The trigger condition of relative location detection may correspond to the foregoing scenario 1 to scenario 4, and the trigger condition of relative location detection may include but is not limited to:

receiving, by the first electronic device, a first message sent by the second electronic device, where the first message is an acknowledgment message for a collaborative display request sent by the first electronic device; or receiving, by the first electronic device, an interface switching operation for a display element in a collaborative display state; or determining, by the first electronic device based on received movement data in a collaborative display state, that the first electronic device has moved; or receiving, by the first electronic device, a location information adjustment request sent by the second electronic device in a collaborative display state, where the location information adjustment request is sent after the second electronic device detects that the second electronic device has moved; or determining, by the first electronic device based on a preset periodicity in a collaborative display state, that a trigger moment of the detection of the relative location relationship is reached.

Operation 1403: The extension device starts the first wave receiver, and feeds back a wave receiver startup complete message to the primary device.

That the extension device starts the first wave receiver may be implemented by sending, by a processor of the extension device, a start instruction to the first wave receiver.

Operation 1404: The primary device sends a first wave signal via the first wave transmitter, and sends a second wave signal via the second wave transmitter, where the first wave signal and the second wave signal have different wave characteristics.

That the primary device sends the first wave signal via the first wave transmitter may be implemented by sending an instruction to the first wave transmitter by using a processor of the primary device. Similarly, that the primary device sends the second wave signal via the second wave transmitter may be implemented by sending an instruction to the second wave transmitter by using the processor of the primary device.

The wave characteristic may be a frequency and/or an amplitude of a wave signal. The first wave signal and the second wave signal have different wave characteristics, so that the first wave signal and the second wave signal are different, and subsequently the extension device can obtain the first wave signal and the second wave signal from the received wave signals, to complete subsequent processing.

Operation 1405: The primary device sends wave information of the first wave signal and wave information of the second wave signal to the extension device.

In some embodiments, the primary device may obtain first location information, and send the first location information to the extension device. The first location information is for describing a left and right location relationship between the first wave transmitter and the second wave transmitter based on an angle from which the user watches the primary device.

If the first wave signal and the second wave signal are sound waves and the wave characteristic is a frequency and/or an amplitude, the wave information of the first wave signal may include a frequency and/or an amplitude of the first wave signal, and the wave information of the second wave signal may include a frequency and/or an amplitude of the second wave signal. If the sound wave characteristics of the first wave signal and the second wave signal are amplitude ascending and descending, the wave information of the first wave signal may include an amplitude sequence of the first wave signal, and the wave information of the second wave signal may include an amplitude sequence of the second wave signal.

If the first wave signal and the second wave signal are Bluetooth signals or UWB signals, and the wave characteristic is a phase and/or an amplitude, the wave information of the first wave signal may include a phase and/or an amplitude of the first wave signal, and the wave information of the second wave signal may include a phase and/or an amplitude of the second wave signal.

Operation 1405 may be performed between operation 1401 and operation 1406, and an execution sequence of operation 1405 and operation 1402 to operation 1404 is not limited.

In an actual application, the wave information of the first wave signal and the wave information of the second wave signal may be preset in the extension device. In this case, this operation may be omitted.

Operation 1406: The extension device obtains the wave signal received by the first wave receiver, determines second location information based on the received wave signal, the wave information of the first wave signal, and the wave information of the second wave signal, and sends the second location information to the primary device.

In a possible embodiment, if the wave signal is a sound wave, this operation may include:

calculating, by the extension device, a first receiving start moment based on the received wave signal and the wave information of the first wave signal, where the first receiving start moment is a start moment when the extension device receives the first wave signal via the first wave receiver, and calculating a second receiving start moment based on the received wave signal and the wave information of the second wave signal, where the second receiving start moment is a start moment when the extension device receives the second wave signal via the first wave receiver;

obtaining, by the extension device, the first location information; and determining, by the extension device, the second location information based on the first receiving start moment, the second receiving start moment, and the first location information.

The first location information may be preset in the extension device, or may be sent by the primary device to the extension device.

Specifically, if sending moments of the first wave signal and the second wave signal by the primary device are the same, the determining, by the extension device, the second location information based on the first receiving start moment and the second receiving start moment may include:

determining a time sequence of the first receiving start moment and the second receiving start moment; and if a result of the determining is that the first receiving start moment is earlier than the second receiving start moment, determining the second location information as first information, where the first information is for describing that the extension device is located on a left side of the primary device based on an angle from which the user watches a display screen of the extension device; or if a result of the determining is that the first receiving start moment is later than the second receiving start moment, determining the second location information as first information, where the first information is for describing that the extension device is located on a right side of the primary device based on an angle from which the user watches a display screen of the extension device.

For example, the setting of the first wave transmitter and the first wave receiver in FIG. 13 is used as an example. If the first receiving start moment is earlier than the second receiving start moment, indicating that the first wave signal first reaches the first wave receiver, the extension device is located on a side close to the first wave transmitter, that is, on a left side of the primary device. If the first receiving start moment is later than the second receiving start moment, indicating that the second wave signal first reaches the first wave receiver, the extension device is located on a side close to the second wave transmitter, that is, on a right side of the primary device.

In some embodiments, if the extension device is located on an upper side or a lower side of the primary device, there may also be a time sequence of the first receiving start moment and the second receiving start moment. In this case, a time difference between the first receiving start moment and the second receiving start moment is generally small. Based on this, to screen out a case in which the extension device is actually located on an upper side or a lower side of the primary device, the time difference between the first receiving start moment and the second receiving start moment may be calculated. If the time difference is less than a preset first threshold, it indicates that there is a higher probability that the extension device is located on the upper side or the lower side of the primary device, and a subsequent operation of determining the second location information may not be performed. In this case, the extension device may send, to the primary device, a request for resending a wave signal, or prompt the user to adjust a physical location of the extension device. A specific value of the first threshold is not limited in embodiments of this application.

Specifically, if the sending moments of the first wave signal and the second wave signal by the primary device are not limited, the determining, by the extension device, the second location information based on the first receiving start moment and the second receiving start moment may include:

obtaining, by the extension device, a first sending start moment and a second sending start moment, where the first sending start moment is a start moment when the primary device sends the first wave signal via the first wave transmitter, and the second sending start moment is a start moment when the primary device sends the second wave signal via the second wave transmitter;

calculating, by the extension device, a first time difference based on the first sending start moment and the first receiving start moment, and calculating a second time difference based on the second sending start moment and the second receiving start moment;

determining, by the extension device, a magnitude relationship between the first time difference and the second time difference; and if a result of the determining is that the first time difference is greater than the second time difference, determining, by the extension device, the second location information as first information, where the first information is for describing that the extension device is located on a left side of the primary device based on the angle from which the user watches the display screen of the extension device; or if a result of the determining is that the first time difference is less than the second time difference, determining, by the extension device, the second location information as second information, where the second information is for describing that the extension device is located on a right side of the primary device based on the angle from which the user watches the display screen of the extension device.

Similarly, to screen out a case in which the extension device is actually located on an upper side or a lower side of the primary device, a difference between the first time difference and the second time difference may be calculated. If the difference is less than a preset second threshold, it indicates that there is a higher probability that the extension device is located on the upper side or the lower side of the primary device, and a subsequent operation of determining the second location information may not be performed. In this case, the extension device may send, to the primary device, a request for resending a wave signal, or prompt the user to adjust a physical location of the extension device. A specific value of the second threshold is not limited in embodiments of this application.

In another possible embodiment, if the wave signal is a Bluetooth signal or a UWB signal, this operation may include: calculating, by the extension device based on the received wave signal, the wave information of the first wave signal, and the wave information of the second wave signal, a phase difference between the first wave signal and the second wave signal received by the first wave receiver, calculating possible orientations of the first wave receiver in a preset plane of the extension device relative to the first wave transmitter and the second wave transmitter by using an angle of departure method, and determining the second location information between the primary device and the extension device based on the calculated possible orientations. The preset plane may be a plane in which a display of the extension device is located. In some embodiments, if the wave signal is a Bluetooth signal or a UWB signal, the first wave signal and the second wave signal have a same wavelength.

The arrangement of the first wave transmitter and the first wave receiver in FIG. 13 is used as an example. If a calculated possible orientation of a transmit source in the preset plane is a right side of the first wave receiver, the extension device is located on the left side of the primary device. If the calculated possible orientation of the transmit source in the preset plane is the left side of the first wave receiver, the extension device is located on the right side of the primary device.

The following briefly describes the angle of departure method.

Figure 14B:
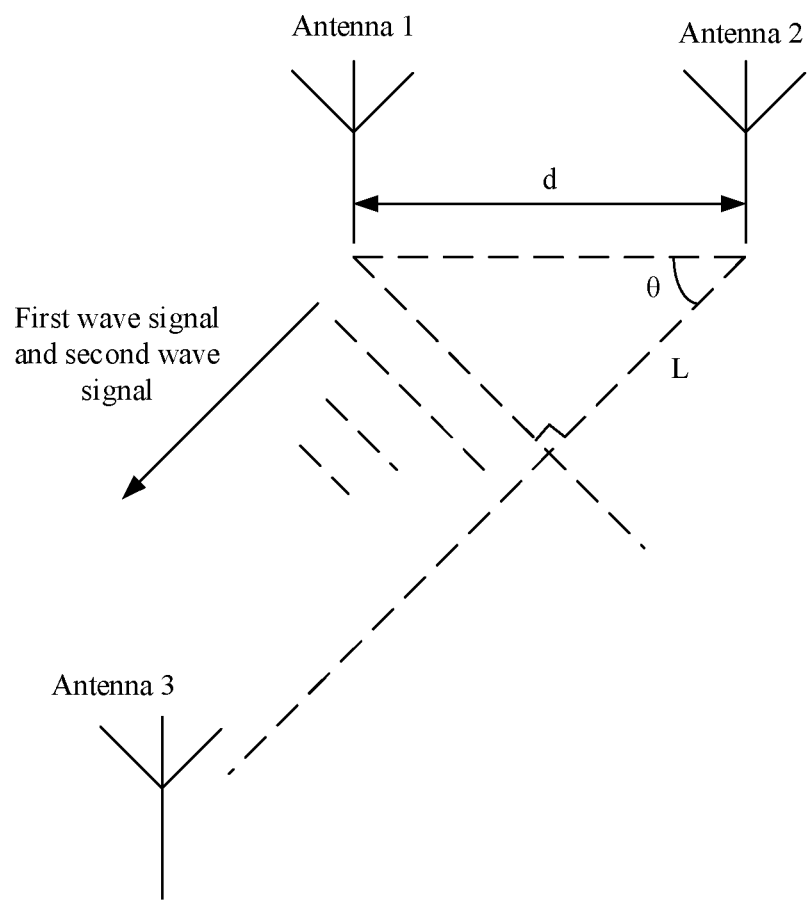
FIG. 14B is a schematic diagram of an angle of departure method according to this application.

As shown in FIG. 14B, the first wave transmitter and the second wave transmitter are Bluetooth antennas, which are respectively shown as an antenna 1 and an antenna 2 in FIG. 14B. A distance d between the antenna 1 and the antenna 2 is fixed. The first wave receiver is also a Bluetooth antenna, which is shown as an antenna 3 in FIG. 14B.

A phase difference between the received first wave signal and the received second wave signal may be calculated based on the wave signal received by the first wave receiver, a wave characteristic of the first wave signal, and a wave characteristic of the second wave signal, and a length of an L side in FIG. 14B may be calculated with reference to wavelengths of the first wave signal and the second wave signal (the wavelengths of the first wave signal and the second wave signal are the same). L=(Wavelength*Phase difference)/(2π). In this case, the angle of departure θ=arccos(L/d) may be calculated by using a trigonometric function.

Figure 14C:
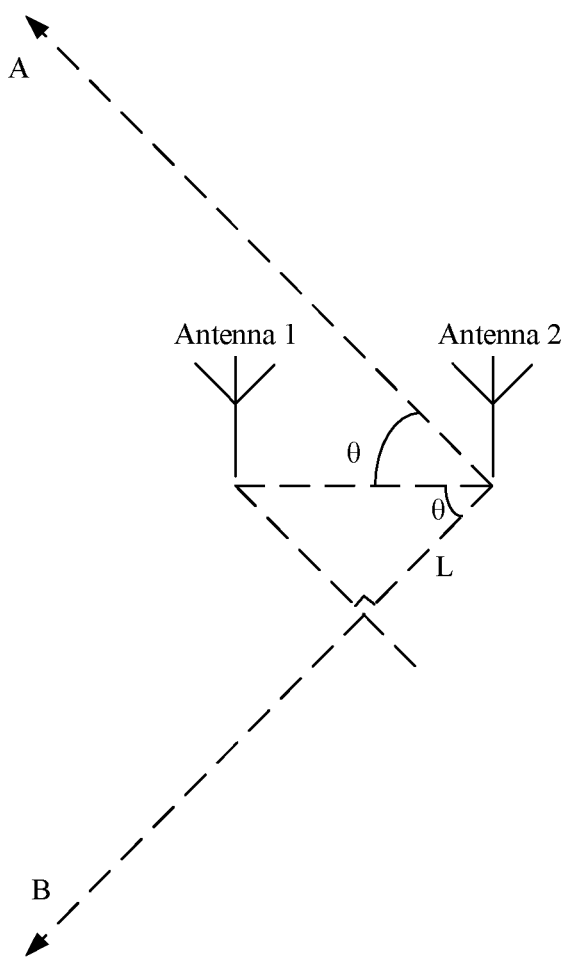
FIG. 14C is a principle diagram of determining first location information based on an angle of departure according to this application.

After the angle of departure θ is calculated, possible orientations of the antenna 3 relative to the antenna 1 and the antenna 2 may be estimated in the preset plane of the extension device as directions A and B in FIG. 14C. Regardless of whether the antenna 3 is located in the direction A or the direction B, left-right location relationships between the antenna 3 and the antenna 1 and between the antenna 3 and the antenna 2 are the same, so that the second location information between the primary device and the extension device may be determined based on the angle of departure θ.

An angle of arrival method in the subsequent description is similar to the angle of departure method, and the only difference lies in that the wave transmitters and the wave receivers are interchanged.

The foregoing method for determining the second location information between the primary device and the extension device based on the angle of departure method may be extended from a Bluetooth signal to a UWB signal. Details are not described herein again.

Based on the foregoing description, the physical relative location recorded in the second location information between the primary device and the extension device obtained in this operation is a left-right relative location. For example, the primary device is located on the left side of the extension device, or the primary device is located on the right side of the extension device.

Operation 1407: The primary device receives the second location information, and adjusts, based on the second location information, third location information preset by the primary device.

In a possible embodiment, the primary device may directly update the third location information by using the second location information, and then may determine again, based on the updated third location information, interfaces that are to be displayed on the primary device and the extension device, and send corresponding interface data to the extension device again.

In some embodiments, the second location information may be consistent with the preset third location information. In this case, the third location information may not be directly updated, thereby reducing a data processing amount of the primary device. After the primary device receives the second location information, this operation may further include: determining, by the primary device, whether the second location information is consistent with the third location information, and if the second location information is consistent with the third location information, keeping the third location information unchanged, or if the second location information is inconsistent with the third location information, performing the operation of updating the third location information by using the second location information.

Figure 15:
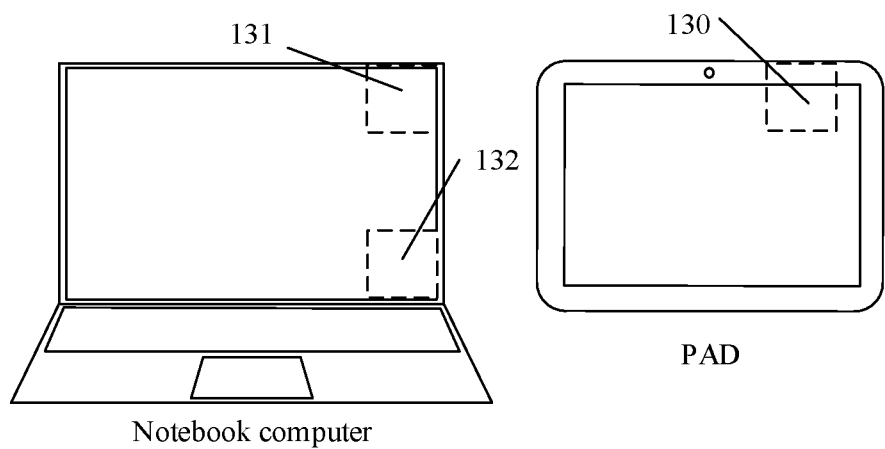
FIG. 15 is a system architectural diagram of another embodiment of a location information adjustment method according to this application.

FIG. 15 is a diagram of a system architecture of another embodiment of a location information adjustment method according to this application. A difference from the system architecture shown in FIG. 13 mainly lies in that a physical relative location between the first wave transmitter and the second wave transmitter in the primary device is an up-down relative location, that is, one wave transmitter is located on an upper side of another wave transmitter. For example, in FIG. 15, an example in which the first wave transmitter 131 is disposed on an upper side of the primary device and the second wave transmitter 132 is disposed on a lower side of the primary device is used. In this case, for a flowchart of an embodiment of a location information adjustment method in a system architecture shown in FIG. 15, refer to FIG. 14A. A difference lies only in that a physical relative location recorded in the second location information determined by the extension device in operation 1406 is an up-down relative location rather than a left-right relative location. Correspondingly, the relative location recorded in the third location information set by the primary device in operations 1406 and 1407 is also an up-down relative location rather than a left-right relative location.

Figure 16:
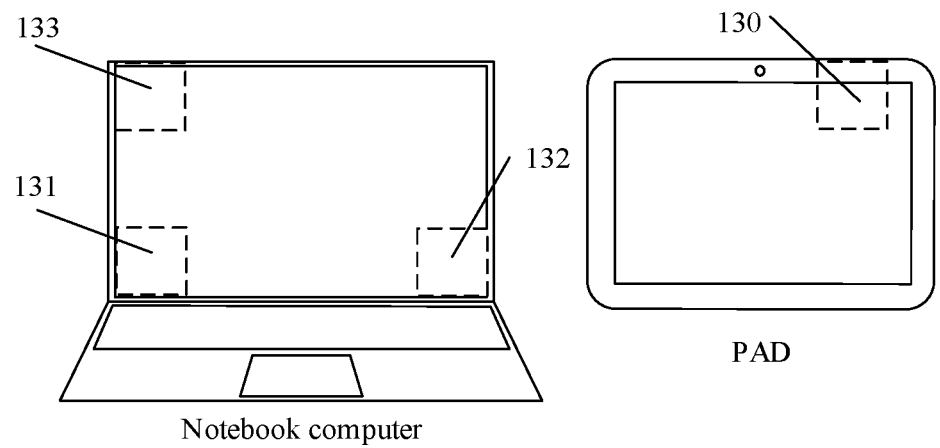
FIG. 16 is a system architectural diagram of still another embodiment of a location information adjustment method according to this application.

FIG. 16 is a system architectural diagram of still another embodiment of a location information adjustment method according to this application. Based on the system architectural diagram shown in FIG. 13, a third wave transmitter 133 is added to the primary device, and in the first wave transmitter to the third wave transmitter, a physical relative location between the first wave transmitter and the second wave transmitter is a left-right relative location, and a physical relative location between the third wave transmitter and the first wave transmitter (or the second wave transmitter) is an up-down relative location. For example, at least one wave transmitter is disposed on an upper side of the primary device, at least one wave transmitter is disposed on a lower side of the primary device, at least one wave transmitter is disposed on a left side of the primary device, and at least one wave transmitter is disposed on a right side of the primary device. For example, in FIG. 16, an example in which the first wave transmitter is disposed on a lower left side, the second wave transmitter is disposed on a lower right side, and the third wave transmitter is disposed on an upper left side is used. It should be noted that FIG. 16 is merely an example, and is not used to limit arrangement locations of the wave transmitters of the primary device in embodiments of this application.

Figure 7:
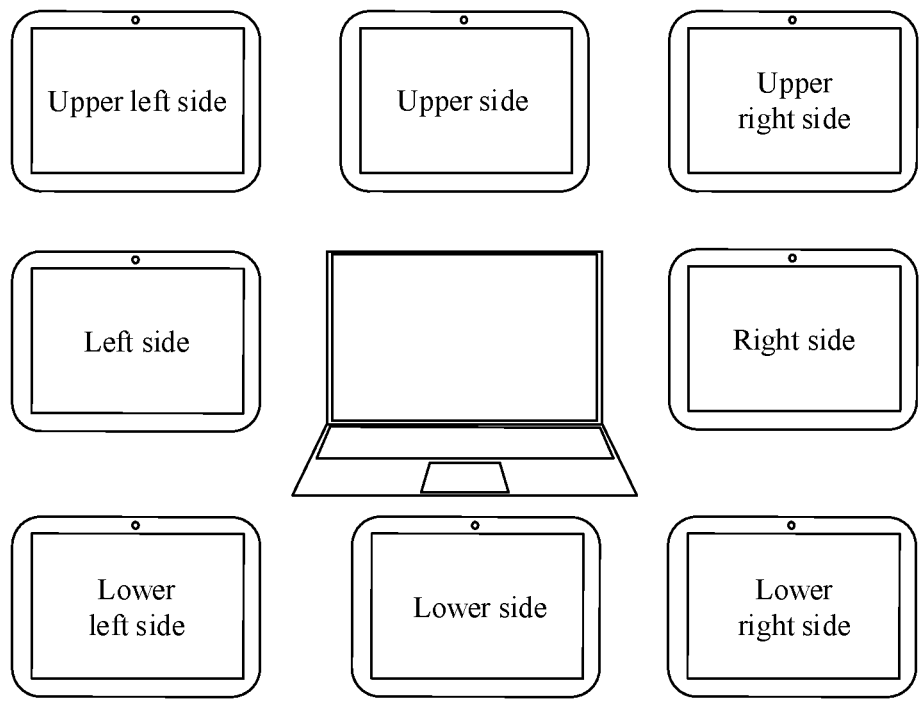
FIG. 7 is an example diagram of a physical relative location between a primary device and an extension device according to an embodiment of this application.

The third wave transmitter of the primary device may send a third wave signal, where the third wave signal, the first wave signal, and the second wave signal have different wave characteristics. Correspondingly, when the primary device simultaneously correspondingly sends the first wave signal to the third wave signal via the first wave transmitter to the third wave transmitter respectively, the first wave receiver of the extension device receives a wave signal, and may determine the physical relative location between the primary device and the extension device based on the received wave signal. Specifically, the extension device may determine left-right relative location information between the primary device and the extension device based on receiving start moments of the received first wave signal and the received second wave signal, and may determine an up-down relative location between the primary device and the extension device based on the receiving start moments of the received first wave signal (or the second wave signal) and the received third wave signal. The physical relative location between the primary device and the extension device determined by the extension device may be extended from up and down and left and right to physical relative locations such as up, down, left, right, upper left, lower left, upper right, and lower right. That is, the extension device is located on an upper side, a lower side, a left side, a right side, an upper left side, a lower left side, an upper right side, a lower right side, and the like of the primary device, as shown in FIG. 7.

Figure 17:
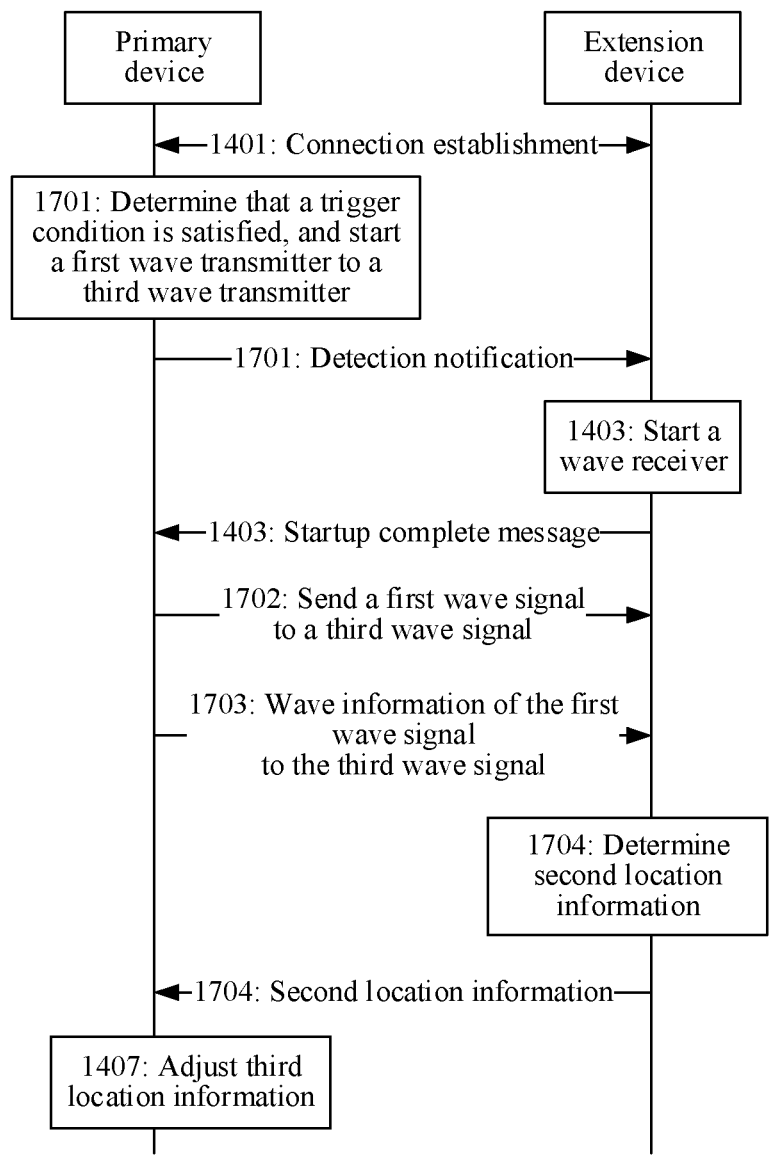
FIG. 17 is a flowchart of another embodiment of a location information adjustment method according to this application.

For a flowchart of an embodiment of a location information adjustment method in a system architecture shown in FIG. 16, refer to FIG. 17. Differences from FIG. 14A are mainly as follows.

Compared with operation 1402, in operation 1701, the primary device starts the third wave transmitter.

Compared with operation 1404, in operation 1702, the third wave transmitter of the primary device sends the third wave signal, where the first wave signal to the third wave signal have different wave characteristics, and the first wave signal to the third wave signal have a same sending start moment.

Compared with operation 1405, in operation 1703, the primary device further sends wave information of the third wave signal to the extension device.

Compared with operation 1406, in operation 1704, the extension device further determines the second location information based on the third wave signal. Specifically, in operation 1704:

the extension device receives a wave signal via the first wave receiver, determines the second location information based on the received wave signal and the wave information of the first wave signal to the third wave signal, and sends the second location information to the primary device.

In a possible embodiment, if the wave signal is a sound wave, this operation may include: determining, by the extension device, a receiving start moment of each wave signal of the first wave signal to the third wave signal respectively based on the received wave signal and the wave information of the first wave signal to the third wave signal, determining left-right relative location information between the primary device and the extension device based on the receiving start moment of the first wave signal, the receiving start moment of the second wave signal, and physical relative location information between the first wave transmitter and the second wave transmitter, and determining up-down relative location information between the primary device and the extension device based on the receiving start moment of the first wave signal, the receiving start moment of the third wave signal, and the physical relative location information between the first wave transmitter and the third wave transmitter; and determining the second location information based on the left-right relative location information and the up-down relative location information between the primary device and the extension device.

In another possible embodiment, if the wave signal is a Bluetooth signal or a UWB signal, this operation may include: calculating, by the extension device, a phase difference between the first wave signal and the second wave signal and a phase difference between the first wave signal and the third wave signal based on the received wave signal, the wave information of the first wave signal, and the wave information of the second wave signal, calculating possible orientations of the first wave receiver in a preset plane of the extension device relative to the first wave transmitter and the second wave transmitter by using an angle of departure method, and determining left-right relative location information between the primary device and the extension device based on the calculated possible orientations; calculating, by the extension device based on the received wave signal, the wave information of the first wave signal, and the wave information of the third wave signal, possible orientations of the first wave receiver in the preset plane of the extension device relative to the first wave transmitter and the third wave transmitter by using the angle of departure method, and determining up-down relative location information between the primary device and the extension device based on the calculated possible orientations; and determining the second location information based on the left-right relative location information and the up-down relative location information between the primary device and the extension device.

Figure 18:
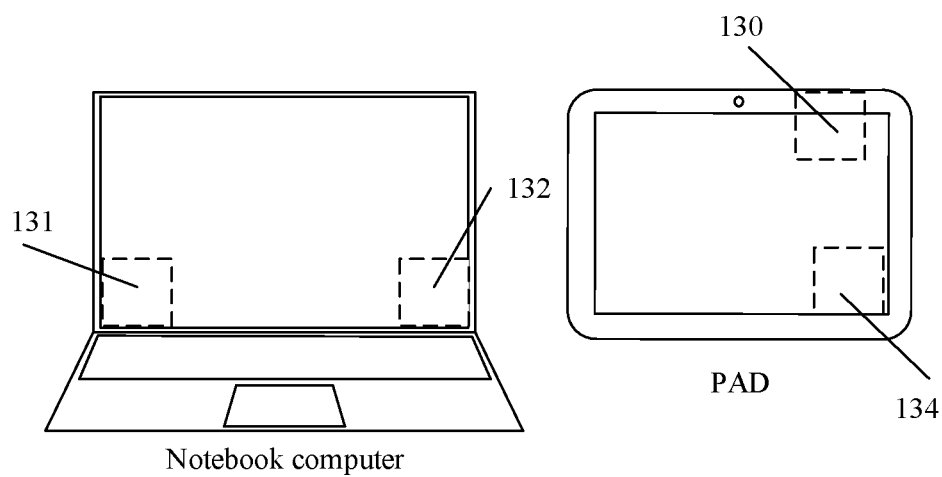
FIG. 18 is a system architectural diagram of still another embodiment of a location information adjustment method according to this application.

FIG. 18 is a system architectural diagram of still another embodiment of a location information adjustment method according to this application. Compared with the system architectural diagram shown in FIG. 13, at least one wave receiver is added to an extension device as an auxiliary receiver, wave receivers disposed in the extension device may be distributed at different locations of the extension device, and specific locations are not limited in embodiments of this application. In FIG. 18, an example in which one second wave receiver 134 is added to the extension device is used.

Figure 19:
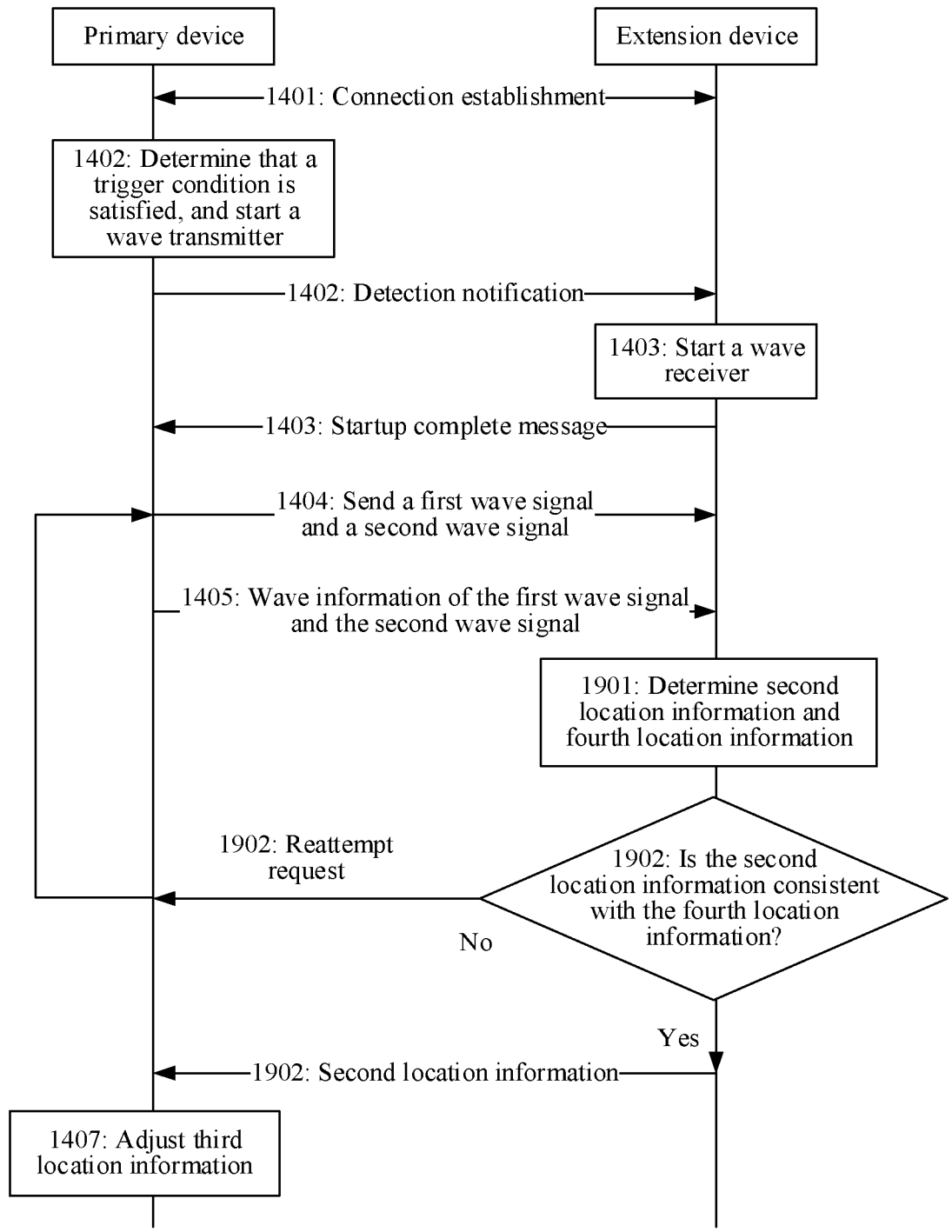
FIG. 19 is a flowchart of still another embodiment of a location information adjustment method according to this application.

The extension device may determine the second location information between the primary device and the extension device based on the wave signal received by the first wave receiver, and also determine the second location information based on the wave signal received by the newly added wave receiver such as the second wave receiver, to implement check of the second location information by using the added wave receiver. In this case, for a flowchart of the embodiment of the location information adjustment method in the system architecture shown in FIG. 18, refer to FIG. 19. Compared with the embodiment shown in FIG. 14A, the second wave receiver is further started in operation 1403. In addition, operation 1406 may be replaced with operations 1901 and 1902.

Operation 1901: The first wave receiver and the second wave receiver of the extension device receive wave signals, determine second location information based on the wave signal received by the first wave receiver and the wave information of the first wave signal and the second wave signal, and determine fourth location information based on the wave signal received by the second wave receiver and the wave information of the first wave signal and the second wave signal.

The fourth location information is for describing a physical relative location between the electronic devices.

Operation 1902: The extension device determines whether the second location information is consistent with the fourth location information, and if the second location information is consistent with the fourth location information, sends the second location information to the primary device, and performs operation 1903, or if the second location information is inconsistent with the fourth location information, sends a reattempt request to the primary device, where the primary device returns to perform operation 1404.

Referring to FIG. 18, in the system architectures shown in FIG. 15 and FIG. 16, the extension device may also add at least one wave receiver as an auxiliary receiver. For a system architecture and a processing procedure after the wave receiver is added, refer to FIG. 18 and FIG. 19. Details are not described herein again.

Figure 20:
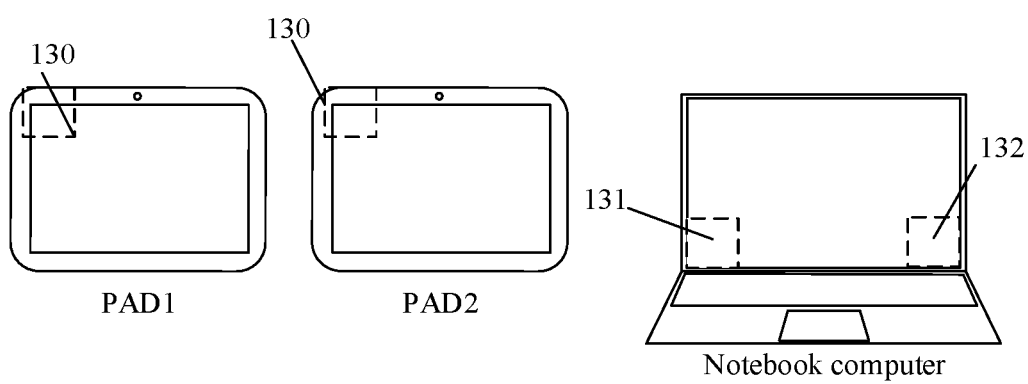
FIG. 20 is a system architectural diagram of still another embodiment of a location information adjustment method according to this application.
Figure 21:
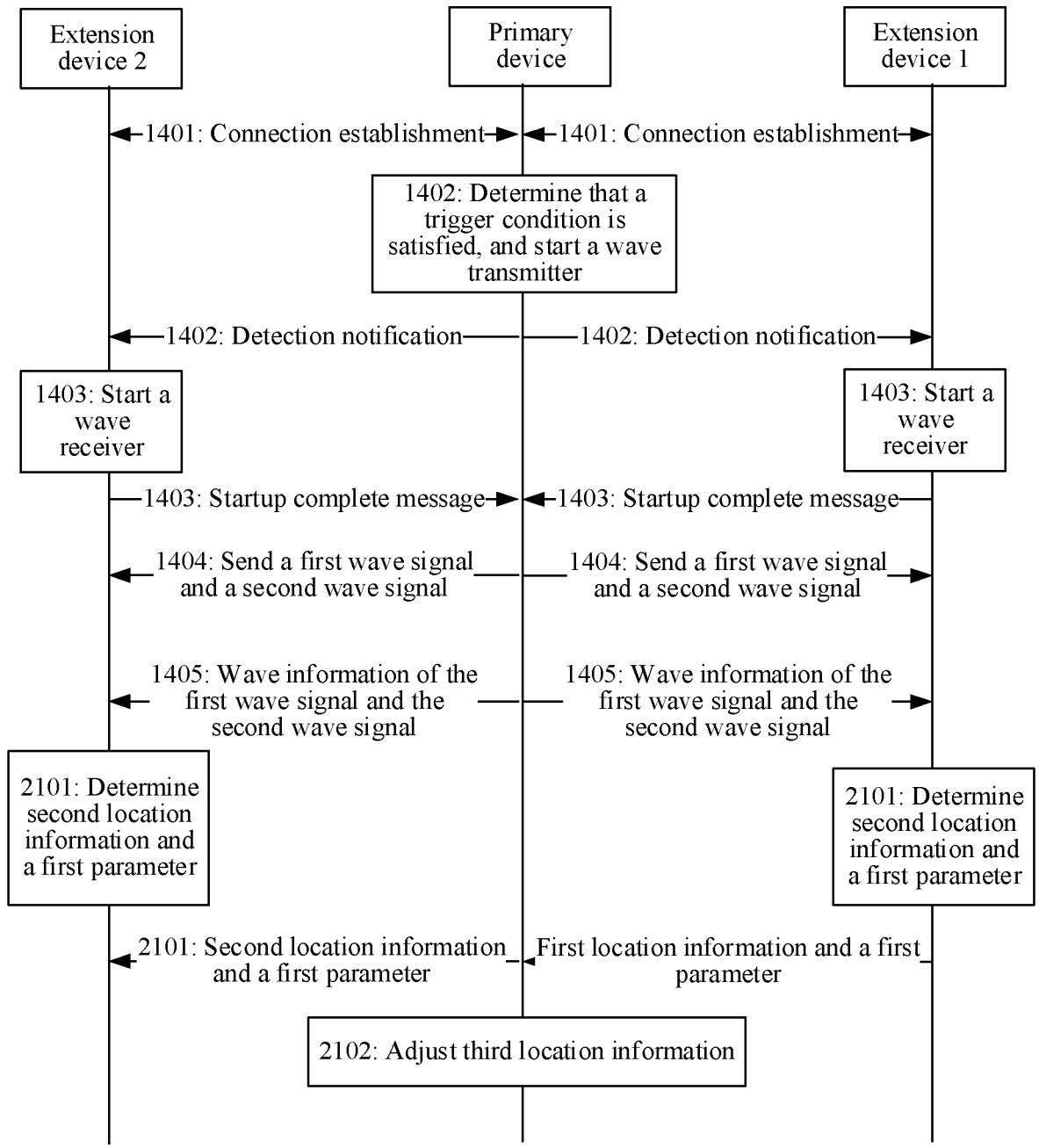
FIG. 21 is a flowchart of still another embodiment of a location information adjustment method according to this application.

FIG. 20 is a system architectural diagram of still another embodiment of a location information adjustment method according to this application. Compared with the system architectural diagram shown in FIG. 13, a quantity of extension devices increases from 1 to at least 2 (two extension devices are shown in FIG. 20). Each extension device includes one wave receiver. For a processing procedure of the location information adjustment method in this embodiment, refer to FIG. 21. Different from FIG. 14A, operation 1401 to operation 1405 are performed between the primary device and each extension device, and then operation 2101 and operation 2102 are performed. Details are as follows.

Operation 2101: For each extension device, the extension device obtains a wave signal received by the first wave receiver, determines second location information between the primary device and the extension device based on the received wave signal and the wave information of the first wave signal and the second wave signal, and sends the second location information and the preset first parameter to the primary device.

If the wave signal is a sound wave, the preset first parameter may be the receiving start moment of the first wave signal and the receiving start moment of the second wave signal that are determined by the extension device.

If the wave signal is a Bluetooth signal or a UWB signal, the preset first parameter may be an angle of departure determined by the extension device.

Operation 2102: The primary device receives the second location information and the preset first parameter that are sent by each extension device, and if it is determined that at least two extension devices send the same second location information, determines second location information between the at least two extension devices based on the preset first parameters of the extension devices with the same second location information, where the second location information between the extension devices is for recording a physical relative location between the at least two extension devices; and the primary device updates third location information based on the second location information sent by each extension device and the determined second location information between the at least two extension sion devices.

If the preset first parameters are the receiving start moment of the first wave signal and the receiving start moment of the second wave signal by the extension device, the determining second location information between the extension devices based on the preset first parameters with the same second location information may include:

comparing the receiving start moments of the first wave signal by the extension devices with the same second location information and/or comparing the receiving start moments of the second wave signal by the extension devices with the same second location information, and determining, according to the principle that the extension device is closer to the primary device when a receiving start moment is earlier, the second location information between the extension devices with the same second location information.

In operation 2101, in addition to sending the second location information to the primary device, each extension device further sends the preset first parameter. For example, when the wave signal is a sound wave, the preset first parameter may be the receiving start moment of the first wave signal and the receiving start moment of the second wave signal that are determined by the extension device. Therefore, when the primary device receives the same second location information sent by two or more extension devices, the primary device may determine, based on the preset first parameters sent by the extension devices, the second location information between the two or more extension sion devices with the same second location information.

For example, the physical relative locations shown in FIG. 20 are used as an example. Both the extension device 1 and the extension device 2 are located on the left side of the primary device, and the extension device 1 is located on the left side of the extension device 2. In this case, the second location information sent by the extension device 1 and the second location information sent by the extension device 2 to the primary device are both on the left side. In this case, the primary device compares the preset first parameters of the extension device 1 and the extension device 2, for example, the receiving start moments of the first wave signal by the extension device, and/or compares the receiving start moments of the second wave signal by the extension device 1 and the extension device 2, and may be determine that the receiving start moment of the first wave signal by the extension device 2 is earlier than the receiving start moment of the first wave signal by the extension device 1, and/or that the receiving start moment of the second wave signal by the extension device 2 is earlier than the receiving start moment of the second wave signal by the extension device 1, so that the primary device may determine that the extension device 1 is located on the left side of the extension device 2.

It should be noted that, in the system architectures shown in FIG. 15, FIG. 16, and FIG. 18, a quantity of extension devices may be extended from 1 to 2 or more. For the system architecture and the processing procedure, refer to FIG. 20 and FIG. 21. Details are not described herein again.

In another embodiment, the wave transmitter and the wave receiver in the foregoing system architecture are interchangeable, that is, the wave transmitter disposed in the primary device is replaced with a wave receiver, and the wave receiver disposed in the extension device is replaced with a wave transmitter. In the following, the wave transmitter and the wave receiver in the system architectures of FIG. 13, FIG. 15, FIG. 16, FIG. 18, and FIG. 20 are respectively used as examples for description.

Figure 22:
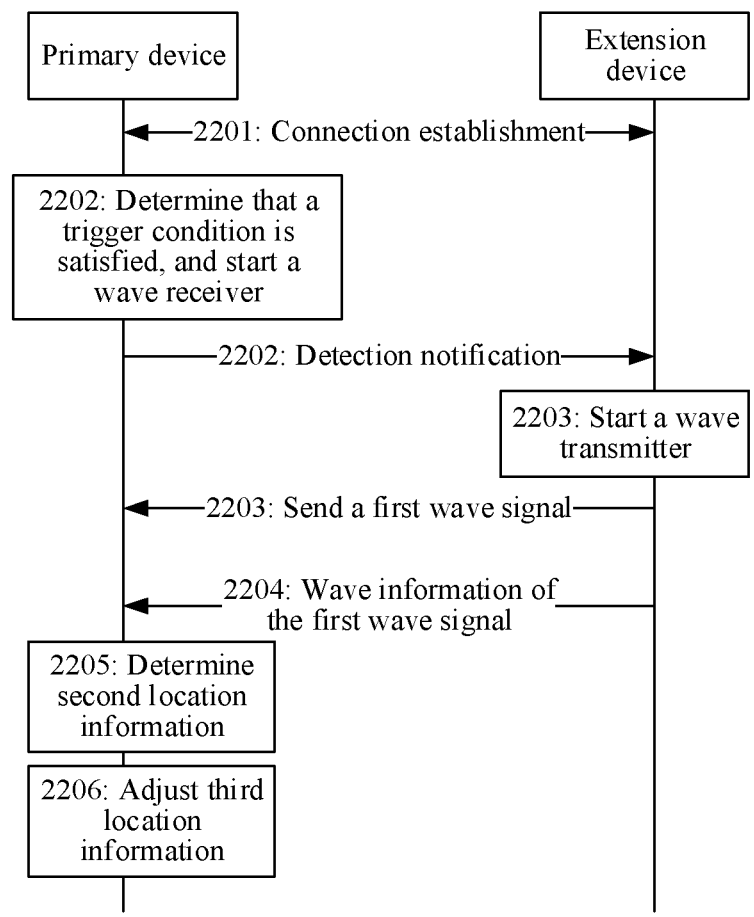
FIG. 22 is a flowchart of still another embodiment of a location information adjustment method according to this application.

If the wave transmitter and the wave receiver are interchanged in the system architecture shown in FIG. 13, the first wave transmitter and the second wave transmitter that are disposed in the primary device are replaced with the first wave receiver and the second wave receiver, and the first wave receiver in the extension device is replaced with the first wave transmitter. As shown in FIG. 22, a flowchart of an embodiment of a location information adjustment method in the system architecture includes the following operations.

Operation 2201: Establish a collaborative display-related connection between the primary device and the extension device.

Operation 2202: The primary device determines that a trigger condition of relative location detection is satisfied, starts the first wave receiver and the second wave receiver, and instructs the extension device to start relative location detection.

Operation 2203: The extension device starts the first wave transmitter, and sends a first wave signal via the first wave transmitter.

Operation 2204: The extension device sends wave information of the first wave signal to the primary device.

If the wave information of the first wave signal is preset in the primary device, this operation may not be performed.

Operation 2205: The primary device separately receives wave signals via the first wave receiver and the second wave receiver, and determines second location information between the primary device and the extension device based on a received first received signal, a received second received signal, and the wave information of the first wave signal.

In a possible embodiment, if the wave signal is a sound wave, this operation may include: determining, based on the first received signal and the wave information of the first wave signal, a receiving start moment of the first wave signal received by the first wave receiver, and determining, based on the second received signal and the wave information of the first wave signal, a receiving start moment of the first wave signal received by the second wave receiver; and determining the second location information based on the receiving start moment corresponding to the first wave receiver and the receiving start moment corresponding to the second wave receiver.

For example, the receiving start moment corresponding to the first wave receiver is earlier than the receiving start moment corresponding to the second wave receiver, the extension device is located on the left side of the primary device, the receiving start moment corresponding to the first wave receiver is later than the receiving start moment corresponding to the second wave receiver, and the extension device is located on the right side of the primary device.

In another possible embodiment, if the wave signal is a Bluetooth signal or a UWB signal, this operation may include: calculating, by the extension device based on the received wave signal, the wave information of the first wave signal, and the wave information of the second wave signal, possible orientations of the first wave receiver in a preset plane of the extension device relative to the first wave transmitter and the second wave transmitter by using an angle of arrival method, and determining left-right relative location information between the primary device and the extension device based on the calculated possible orientations.

Operation 2206: The primary device updates preset third location information in the primary device by using the second location information.

If the wave transmitter and the wave receiver are interchanged in the system architecture shown in FIG. 15, the first wave transmitter and the second wave transmitter that are disposed in the primary device are replaced with the first wave receiver and the second wave receiver, and the first wave receiver in the extension device is replaced with the first wave transmitter. For a flowchart of an embodiment of a location information adjustment method in the system architecture, refer to FIG. 22. A difference lies only in that the second location information determined by the primary device in operation 2205 is an up-down relative location rather than a left-right relative location.

Figure 23:
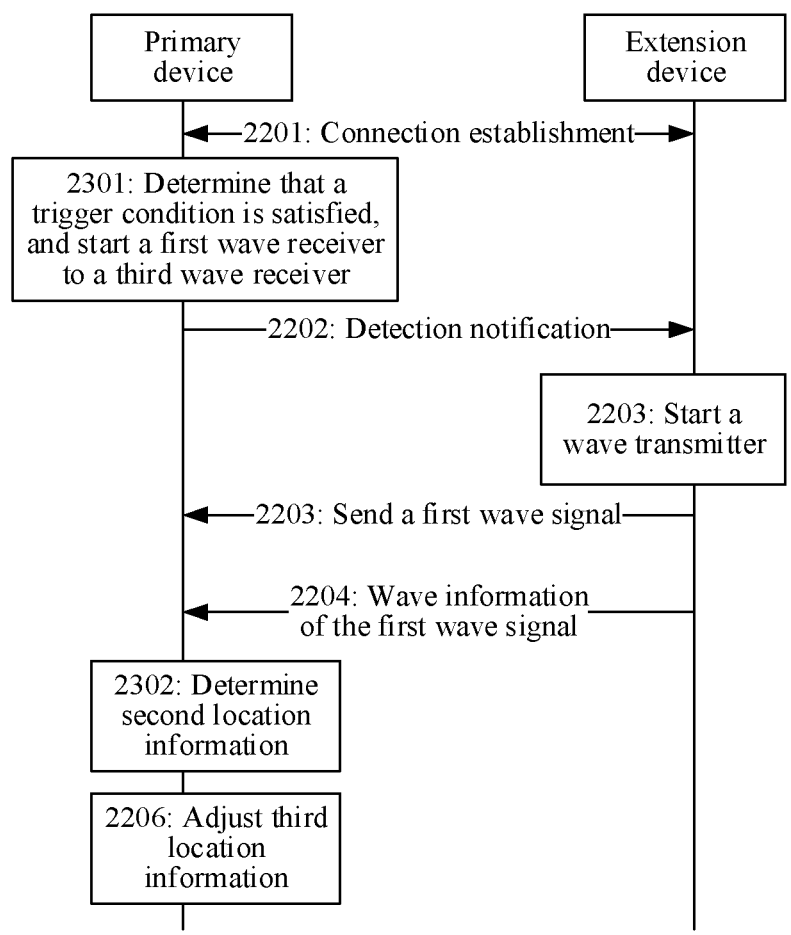
FIG. 23 is a flowchart of still another embodiment of a location information adjustment method according to this application.

If the wave transmitter and the wave receiver are interchanged in the system architecture shown in FIG. 16, the first wave transmitter to the third wave transmitter that are disposed in the primary device are replaced with the first wave receiver to the third wave receiver, and the first wave receiver in the extension device is replaced with the first wave transmitter. For a flowchart of an embodiment of a location information adjustment method in the system architecture, refer to FIG. 23. Differences from FIG. 22 are mainly as follows.

Compared with operation 2202, in operation 2301, the primary device further starts the third wave receiver.

Compared with operation 2205, in operation 2302, the primary device further receives a wave signal by using the third wave receiver, and further determines the second location information based on a third received signal received by the third wave receiver. In this case, if the wave signal is a sound wave, operation 2302 may include:

determining, based on the first received signal and the wave information of the first wave signal, a receiving start moment of the first wave signal received by the first wave receiver, determining, based on the second received signal and the wave information of the first wave signal, a receiving start moment of the first wave signal received by the second wave receiver, and determining, based on the third received signal and the wave information of the first wave signal, a receiving start moment of the first wave signal received by the third wave receiver; and determining left-right relative location information between the primary device and the extension device based on the receiving start moment corresponding to the first wave receiver and the receiving start moment corresponding to the second wave receiver, and determining the second location information based on the receiving start moment corresponding to the first wave receiver (or the second wave receiver) and the receiving start moment corresponding to the third wave receiver.

Therefore, the relative location may be extended to at least: up, down, left, right, upper left, lower left, upper right, lower right, and the like.

If the wave transmitter and the wave receiver are interchanged in the system architecture shown in FIG. 18, the first wave transmitter and the second wave transmitter that are disposed in the primary device are replaced with the first wave receiver and the second wave receiver, the first wave receiver in the extension device is replaced with the first wave transmitter, and the second wave receiver is replaced with the second wave transmitter.

The second wave transmitter sends the second wave signal, where the first wave signal and the second wave signal have different wave characteristics.

In this embodiment, the start moments at which the first wave transmitter and the second wave transmitter send the wave signals may be the same or different. This is not limited in this embodiment.

Figure 24:
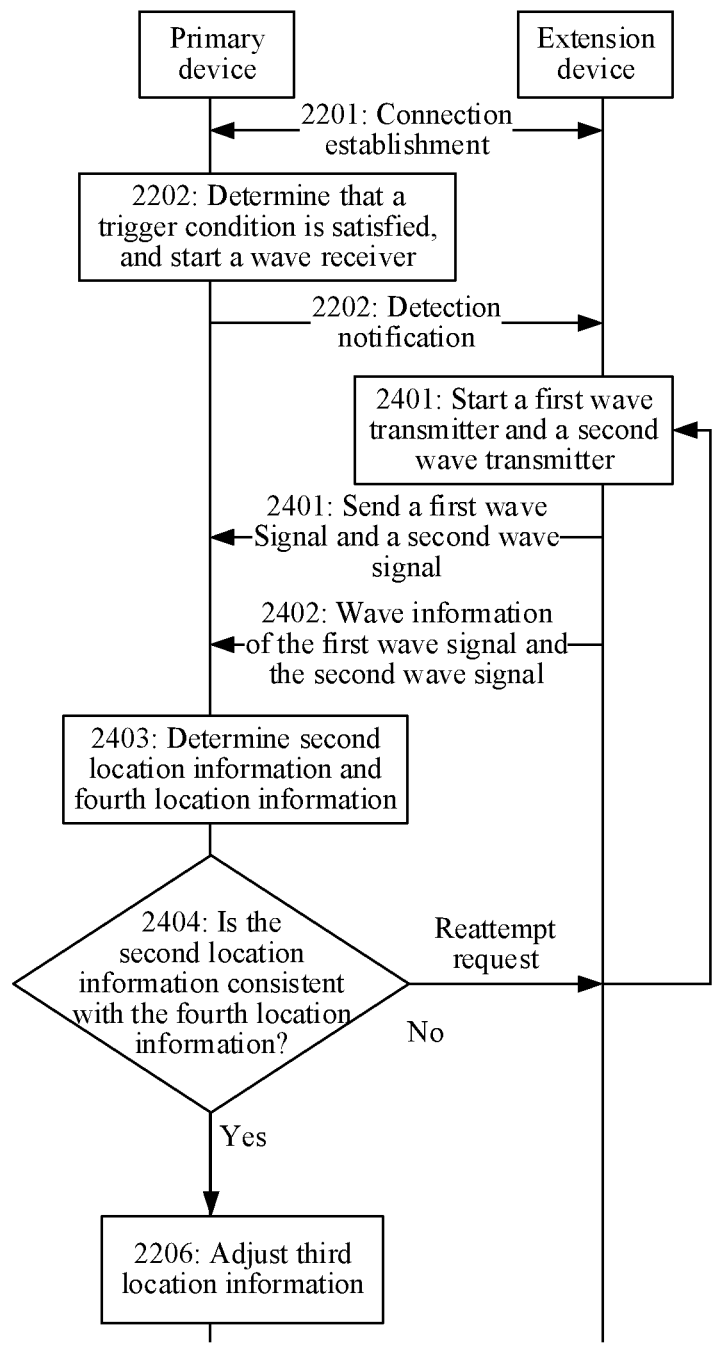
FIG. 24 is a flowchart of still another embodiment of a location information adjustment method according to this application.

If the second wave transmitter is configured to check the physical relative location determined by the primary device based on the first wave transmitter, a processing procedure may be shown in FIG. 24. Compared with the operation procedure shown in FIG. 22, operations 2203 to 2205 are replaced with operations 2401 to 2404.

Operation 2401: The extension device starts the first wave transmitter and the second wave transmitter, sends the first wave signal via the first wave transmitter, and sends the second wave signal via the second wave transmitter.

Operation 2402: The extension device sends the wave information of the first wave signal and the second wave signal to the primary device.

Operation 2403: The primary device receives wave signals via the first wave receiver and the second wave receiver respectively, determines the second location information between the primary device and the extension device based on the first received signal received by the first wave receiver, the second received signal received by the second wave receiver, and the wave information of the first wave signal, and determines fourth location information between the primary device and the extension device based on the first received signal, the second received signal, and the wave information of the second wave signal.

Operation 2404: The primary device determines whether the second location information is consistent with the fourth location information, and if the second location information is consistent with the fourth location information, performs operation 2206, or if the second location information is consistent with the fourth location information, the primary device instructs the extension device to restart relative location detection, and the extension device performs operation 2401.

If the wave transmitter and the wave receiver are interchanged in the system architecture shown in FIG. 20, the first wave transmitter and the second wave transmitter that are disposed in the primary device are replaced with the first wave receiver and the second wave receiver, and the first wave receiver disposed in each extension device is replaced with the first wave transmitter. In this case, the first wave signals sent by the first wave transmitters in the extension devices have different wave characteristics.

Figure 25:
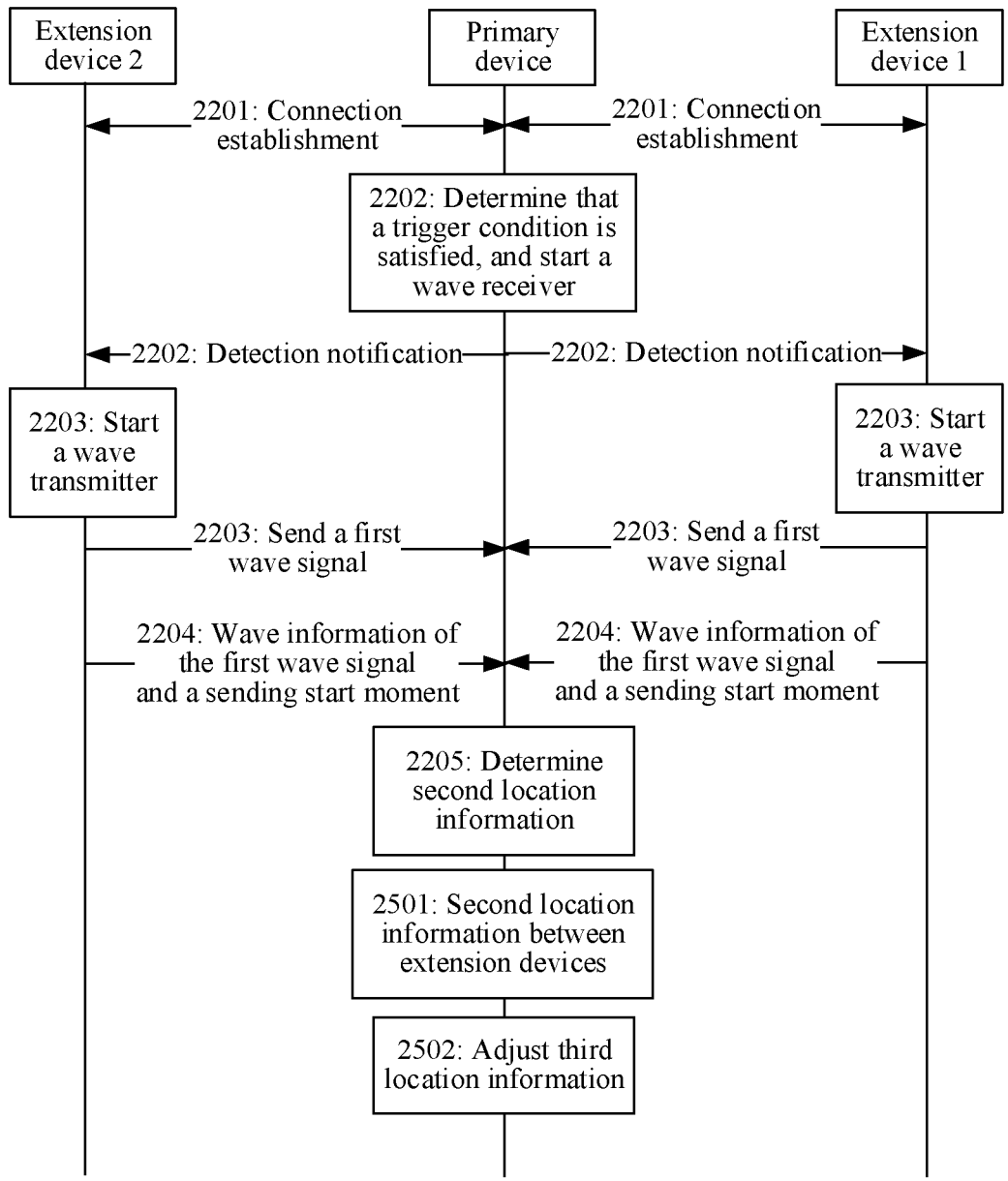
FIG. 25 is a flowchart of still another embodiment of a location information adjustment method according to this application.

The operation procedure shown in FIG. 25 may be performed between the primary device and each extension device. Differences between the operation procedure shown in FIG. 25 and the operation procedure shown in FIG. 22 are mainly as follows. Operation 2201 to operation 2205 are separately performed between the primary device and each extension device. After determining the second location information between the primary device and each extension device, the primary device performs operation 2501 and operation 2502. In addition, in operation 2204, when sending the wave information of the first wave signal to the primary device, each extension device may further send a sending start moment of the first wave signal to the primary device. Operations 2501 to 2502 are as follows.

Operation 2501: The primary device determines whether at least two extension devices have same second location information, and if at least two extension devices have the same second location information, for the at least two extension devices with the same second location information, separately calculates a time difference of the first wave signal corresponding to each extension device with the same second location information, and determines, based on the time differences, the second location information between the extension devices with the same second location information, to obtain the second location information between the electronic devices.

The time difference of the first wave signal corresponding to each extension device is a time difference between a receiving start moment of the first wave signal by the primary device and the sending start moment of the first wave signal.

Operation 2502: The primary device adjusts third location information based on the second location information.

Because there are at least two extension devices, actual physical locations of two or more extension devices may be located on a same side of the primary device. Therefore, second location information of the at least two extension devices determined by the primary device is the same. To resolve this problem, the extension device may send, to the primary device, a sending start moment of the first wave signal sent by the first wave transmitter of the extension device. Correspondingly, the primary device may determine, based on the receiving start moment and the sending start moment of the same first wave signal, a time difference of the wave signal, and for at least two extension devices with the same second location information, determine second location information between the primary device and the at least two extension devices and second location information between the at least two extension devices based on the time differences of the extension devices.

The physical relative location shown in FIG. 20 is still used as an example. The primary device compares a time difference of the extension device 1 and a time difference of the extension device 2. If the time difference of the extension device 1 is greater than the time difference of the extension device 2, it may be determined that the extension device 1 is located on the left side of the extension device 2.

In another embodiment, the structure of the primary device and the structure of the extension device in the foregoing system architecture are interchangeable, that is, the structure of the primary device in the system architecture is replaced with the structure of the extension device, and the structure of the extension device is replaced with the structure of the primary device. In this case, for a processing procedure of the location information adjustment method in each system architecture, reference may be correspondingly made to the processing procedure in the foregoing embodiment, and adaptive adjustment is performed. The difference lies in that the primary device and the extension device are interchanged as an execution body of the operations. If the extension device determines the second location information, the determined second location information may be sent to the primary device, and the primary device updates preset third location information in the primary device based on the second location information.

It may be understood that some or all of the operations in the foregoing embodiments are merely examples, and other operations or variations of various operations may be further performed in embodiments of this application. In addition, the operations may be performed in different sequences presented in the foregoing embodiments, and it is possible that not all operations in the foregoing embodiments may be performed.

An embodiment of this application further provides an electronic device, including: one or more processors; a memory; and one or more computer programs, where the one or more computer programs are stored in the memory, the one or more computer programs include instructions, and when the instructions are executed by the device, the device is enabled to perform the methods shown in FIG. 14A to FIG. 25.

An embodiment of this application further provides a computer-readable storage medium. The computer-readable storage medium stores a computer program. When the computer program is run on a computer, the computer is enabled to perform the methods provided in the embodiments shown in FIG. 14A to FIG. 25 of this application.

An embodiment of this application further provides a computer program product. The computer program product includes a computer program. When the computer program is run on a computer, the computer is enabled to perform the methods provided in the embodiments shown in FIG. 14A to FIG. 25 of this application.

In this application, "at least one" means one or more, and "a plurality of" means two or more. The term "and/or" describes an association relationship for describing associated objects and represents that three relationships may exist. For example, A and/or B may represent the following three cases: Only A exists, both A and B exist, and only B exists. A and B may be singular or plural. The character "/" generally represents an "or" relationship between the associated objects. "At least one of the following items" or a similar expression thereof indicates any combination of these items, including a single item or any combination of a plurality of items. For example, at least one of a, b, or c may indicate a, b, c, a and b, a and c, b and c, or a, b, and c, where a, b, and c may be singular or plural.

A person of ordinary skill in the art may be aware that, units and algorithm operations described in embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In several embodiments provided in this application, when any function is implemented in the form of a software functional unit and sold or used as an independent product, the function may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the operations of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely example embodiments of this application. Any variation or replacement that may be readily figured out by a person skilled in the art within the technical scope disclosed in this application shall fall within the protection scope of this application. The protection scope of this application shall be subject to the protection scope of the claims.

What is claimed is:

1. A location information adjustment system, comprising a first electronic device and a second electronic device,
wherein the first electronic device is configured to:
determine that a first trigger condition is satisfied, wherein the first trigger condition is for triggering detection of a relative location relationship between the first electronic device and the second electronic device;
send a first instruction, wherein the first instruction is for enabling a first sound wave transmitter to send a first sound wave signal;
send a second instruction, wherein the second instruction is for enabling a second sound wave transmitter to send a second sound wave signal, wherein the first sound wave signal and the second sound wave signal have different amplitudes and/or frequencies, and wherein the first sound wave transmitter and the second sound wave transmitter are disposed in the first electronic device;
receive second location information from the second electronic device; and
update third location information by using the second location information, wherein the third location information is for describing a left-right relative location relationship between the first electronic device and the second electronic device based on an angle from which a user watches a display screen of the first electronic device, and
wherein the second electronic device is configured to:
send a third instruction, wherein the third instruction is for enabling a first sound wave receiver to receive the first sound wave signal and the second sound wave signal, and the first sound wave receiver is disposed in the second electronic device;
calculate a first receiving start moment and a second receiving start moment, wherein the first receiving start moment is a start moment when the first sound wave receiver receives the first sound wave signal, and the second receiving start moment is a start moment when the first sound wave receiver receives the second sound wave signal;

obtain first location information, and determine the second location information based on the first receiving start moment, the second receiving start moment, and the first location information, wherein the first location information is for describing that the first sound wave transmitter is located on a left side of the second sound wave transmitter based on the angle from which the user watches the first electronic device; and the second location information is for describing the left-right relative location relationship between the first electronic device and the second electronic device based on an angle from which the user watches a display screen of the second electronic device; and send the second location information to the first electronic device.

2. The system according to claim 1, wherein sending moments of the first sound wave signal and the second sound wave signal are the same, and wherein the second electronic device is configured to determine the second location information based on the first receiving start moment, the second receiving start moment, and the first location information by:

determining a time sequence of the first receiving start moment and the second receiving start moment; and in response to determining that the first receiving start moment is earlier than the second receiving start moment, determining the second location information as first information, wherein the first information is for describing that the second electronic device is located on a left side of the first electronic device based on the angle from which the user watches the display screen of the second electronic device; or in response to determining that the first receiving start moment is later than the second receiving start moment, determining the second location information as second information, wherein the second information is for describing that the second electronic device is located on a right side of the first electronic device based on the angle from which the user watches the display screen of the second electronic device.

3. The system according to claim 2, wherein the determining, by the second electronic device, the time sequence of the first receiving start moment and the second receiving start moment is performed in response to determining that a time difference between the first receiving start moment and the second receiving start moment is not less than a preset first threshold.

4. The system according to claim 1, wherein the second electronic device is configured to determine the second location information based on the first receiving start moment, the second receiving start moment, and the first location information by:

obtaining a first sending start moment and a second sending start moment, wherein the first sending start moment is a start moment when the first electronic device sends the first sound wave signal via the first sound wave transmitter, and the second sending start moment is a start moment when the second electronic device sends the second sound wave signal via the second sound wave transmitter;

calculating a first time difference based on the first sending start moment and the first receiving start moment, and calculating a second time difference based on the second sending start moment and the second receiving start moment;

determining a magnitude relationship between the first time difference and the second time difference; and in response to determining that the first time difference is greater than the second time difference, determining the second location information as first information, wherein the first information is for describing that the second electronic device is located on a left side of the first electronic device based on the angle from which the user watches the display screen of the second electronic device; or in response to determining that the first time difference is less than the second time difference, determining the second location information as second information, wherein the second information is for describing that the second electronic device is located on a right side of the first electronic device based on the angle from which the user watches the display screen of the second electronic device.

5. The system according to claim 4, wherein the determining, by the second electronic device, the magnitude relationship between the first time difference and the second time difference in performed in response to determining that a difference between the first time difference and the second time difference is not less than a preset second threshold.

6. The system according to claim 1, wherein, to determine that the first trigger condition is satisfied, the first electronic device is to:

receive a first message sent by the second electronic device, wherein the first message is an acknowledgment message for a collaborative display request sent by the first electronic device; or receive an interface switching operation for a display element in a collaborative display state; or determine, based on received movement data in a collaborative display state, that the first electronic device has moved; or receive a location information adjustment request sent by the second electronic device in a collaborative display state, wherein the location information adjustment request is sent after the second electronic device detects that the second electronic device has moved; or determine, based on a preset periodicity in a collaborative display state, that a trigger moment of the detection of the relative location relationship is reached.

7. The system according to claim 1, wherein, the third location information is updated by using the second location information in response to determining that the third location information is inconsistent with the second location information.

8. A location information adjustment method, applied to a first electronic device, and comprising:

determining that a first trigger condition is satisfied, wherein the first trigger condition is for triggering detection of a relative location relationship between the first electronic device and a second electronic device;

sending a first instruction, wherein the first instruction is for enabling a first sound wave transmitter to send a first sound wave signal; and sending a second instruction, wherein the second instruction is for enabling a second sound wave transmitter to send a second sound wave signal, wherein the first sound wave signal and the second sound wave signal have different amplitudes and/or frequencies, and wherein the first sound wave transmitter and the second sound wave transmitter are disposed in the first electronic device;

receiving second location information sent by the second electronic device, wherein the second location information is for describing a left-right relative location relationship between the first electronic device and the second electronic device based on an angle from which a user watches a display screen of the second electronic device, and wherein the second location information is determined by the second electronic device based on a first receiving start moment, a second receiving start moment, and first location information, the first receiving start moment is a start moment when a first sound wave receiver receives the first sound wave signal, the second receiving start moment is a start moment when the first sound wave receiver receives the second sound wave signal, the first location information is for describing that the first sound wave transmitter is located on a left side of the second sound wave transmitter based on an angle from which the user watches the first electronic device, and the first sound wave receiver is disposed in the second electronic device; and updating third location information by using the second location information, wherein the third location information is for describing the left-right relative location relationship between the first electronic device and the second electronic device based on an angle from which the user watches a display screen of the first electronic device.

9. The method according to claim 8, wherein the determining that the first trigger condition is satisfied comprises:
receiving a first message sent by the second electronic device, wherein the first message is an acknowledgment message for a collaborative display request sent by the first electronic device; or
receiving an interface switching operation for a display element in a collaborative display state; or
determining, based on received movement data in a collaborative display state, that the first electronic device has moved; or
receiving a location information adjustment request sent by the second electronic device in a collaborative display state, wherein the location information adjustment request is sent after the second electronic device detects that the second electronic device has moved; or
determining, based on a preset periodicity in a collaborative display state, that a trigger moment of the detection of the relative location relationship is reached.

10. The method according to claim 8, wherein the updating the third location information by using the second location information is performed in response to determining that the second location information is inconsistent with the third location information.

11. A location information adjustment method, applied to a second electronic device, and comprising:
sending a third instruction, wherein the third instruction is for enabling a first sound wave receiver to receive a first sound wave signal and a second sound wave signal, and the first sound wave receiver is disposed in the second electronic device; the first sound wave signal is sent via a first sound wave transmitter after a first electronic device determines that a first trigger condition is satisfied, the second sound wave signal is sent via a second sound wave transmitter after the first electronic device determines that the first trigger condition is satisfied, and the first trigger condition is for triggering detection of a relative location relationship between the first electronic device and the second electronic device, wherein the first sound wave signal and the second sound wave signal have different amplitudes and/or frequencies, wherein the first sound wave transmitter and the second sound wave transmitter are disposed in the first electronic device, and wherein the first sound wave transmitter is located on a left side of the second sound wave transmitter based on an angle from which a user watches the first electronic device;

calculating a first receiving start moment and a second receiving start moment, wherein the first receiving start moment is a start moment when the first sound wave receiver receives the first sound wave signal, and the second receiving start moment is a start moment when the first sound wave receiver receives the second sound wave signal;

obtaining first location information, and determining second location information based on the first receiving start moment, the second receiving start moment, and the first location information, wherein the first location information is for describing that the first sound wave transmitter is located on the left side of the second sound wave transmitter based on the angle from which the user watches the first electronic device, and wherein the second location information is for describing a left-right relative location relationship between the first electronic device and the second electronic device based on an angle from which the user watches a display screen of the second electronic device; and sending the second location information to the first electronic device, wherein the second location information is for indicating the first electronic device to update third location information by using the second location information, and wherein the third location information is for describing the left-right relative location relationship between the first electronic device and the second electronic device based on an angle from which the user watches a display screen of the first electronic device.

12. The method according to claim 11, wherein sending moments of the first sound wave signal and the second sound wave signal are the same; and the determining the second location information based on the first receiving start moment, the second receiving start moment, and the first location information comprises:
determining a time sequence of the first receiving start moment and the second receiving start moment; and
in response to determining that the first receiving start moment is earlier than the second receiving start moment, determining the second location information as first information, wherein the first information is for describing that the second electronic device is located on a left side of the first electronic device based on the angle from which the user watches the display screen of the second electronic device; or
in response to determining that the first receiving start moment is later than the second receiving start moment, determining the second location information as second information, wherein the second information is for describing that the second electronic device is located on a right side of the first electronic device based on the angle from which the user watches the display screen of the second electronic device.

13. The method according to claim 12, wherein the determining the time sequence of the first receiving start moment and the second receiving start moment is performed in response to determining that a time difference between the first receiving start moment and the second receiving start moment is not less than a preset first threshold.

14. The method according to claim 11, wherein the determining the second location information based on the first receiving start moment, the second receiving start moment, and the first location information comprises:
   obtaining a first sending start moment and a second sending start moment, wherein the first sending start moment is a start moment when the first electronic device sends the first sound wave signal via the first sound wave transmitter, and the second sending start moment is a start moment when the second electronic device sends the second sound wave signal via the second sound wave transmitter;
   calculating a first time difference based on the first sending start moment and the first receiving start moment, and calculating a second time difference based on the second sending start moment and the second receiving start moment;
   determining a magnitude relationship between the first time difference and the second time difference; and
   in response to determining that the first time difference is greater than the second time difference, determining the second location information as first information, wherein the first information is for describing that the second electronic device is located on a left side of the first electronic device based on the angle from which the user watches the display screen of the second electronic device; or
   in response to determining that the first time difference is less than the second time difference, determining the second location information as second information, wherein the second information is for describing that the second electronic device is located on a right side of the first electronic device based on the angle from which the user watches the display screen of the second electronic device.

15. The method according to claim 14, the determining the magnitude relationship between the first time difference and the second time difference is performed in response to determining that a difference between the first time difference and the second time difference is not less than a preset second threshold.

16. A first electronic device, comprising:
   a first sound wave transmitter, a second sound wave transmitter, a receiver, and a processor, wherein the processor is configured to perform operations comprising:
   determining that a first trigger condition is satisfied, wherein the first trigger condition is for triggering detection of a relative location relationship between the first electronic device and a second electronic device;
   sending a first instruction, wherein the first instruction is for enabling the first sound wave transmitter to send a first sound wave signal;
   sending a second instruction, wherein the second instruction is for enabling the second sound wave transmitter to send a second sound wave signal, and wherein the first sound wave signal and the second sound wave signal have different amplitudes and/or frequencies;
   obtaining second location information that is sent by the second electronic device and received by the receiver, wherein the second location information is for describing a left-right relative location relationship between the first electronic device and the second electronic device based on an angle from which a user watches a display screen of the second electronic device, and wherein the second location information is determined by the second electronic device based on a first receiving start moment, a second receiving start moment, and first location information, the first receiving start moment is a start moment when a first sound wave receiver receives the first sound wave signal, the second receiving start moment is a start moment when the first sound wave receiver receives the second sound wave signal, the first location information is for describing that the first sound wave transmitter is located on a left side of the second sound wave transmitter based on an angle from which the user watches the first electronic device, and the first sound wave receiver is disposed in the second electronic device; and
   updating third location information by using the second location information, wherein the third location information is for describing the left-right relative location relationship between the first electronic device and the second electronic device based on an angle from which the user watches a display screen of the first electronic device.

17. The first electronic device according to claim 16, wherein sending moments of the first sound wave signal and the second sound wave signal are the same, and
   wherein, to determine the second location information based on the first receiving start moment, a second receiving start moment, and a first location information, the second electronic device is to:
   determine a time sequence of the first receiving start moment and the second receiving start moment; and
   in response to determining that the first receiving start moment is earlier than the second receiving start moment, determine the second location information as first information, wherein the first information is for describing that the second electronic device is located on a left side of the first electronic device based on the angle from which the user watches the display screen of the second electronic device; or
   in response to determining that the first receiving start moment is later than the second receiving start moment, determine the second location information as second information, wherein the second information is for describing that the second electronic device is located on a right side of the first electronic device based on the angle from which the user watches the display screen of the second electronic device.

18. The first electronic device according to claim 16, wherein to determine the second location information based on the first receiving start moment, a second receiving start moment, and a first location information, the second electronic device is to:
   obtain a first sending start moment and a second sending start moment, wherein the first sending start moment is a start moment when the first electronic device sends the first sound wave signal via the first sound wave transmitter, and the second sending start moment is a start moment when the second electronic device sends the second sound wave signal via the second sound wave transmitter;
   calculate a first time difference based on the first sending start moment and the first receiving start moment, and calculating a second time difference based on the second sending start moment and the second receiving start moment;

determine a magnitude relationship between the first time difference and the second time difference; and in response to determining that the first time difference is greater than the second time difference, determine the second location information as first information, wherein the first information is for describing that the second electronic device is located on a left side of the first electronic device based on the angle from which the user watches the display screen of the second electronic device; or in response to determining that the first time difference is less than the second time difference, determine the second location information as second information, wherein the second information is for describing that the second electronic device is located on a right side of the first electronic device based on the angle from which the user watches the display screen of the second electronic device.

19. The first electronic device according to claim 16, wherein the determining, by the first electronic device, that the first trigger condition is satisfied comprises:

receiving a first message sent by the second electronic device, wherein the first message is an acknowledgment message for a collaborative display request sent by the first electronic device; or receiving an interface switching operation for a display element in a collaborative display state; or determining, based on received movement data in a collaborative display state, that the first electronic device has moved; or receiving a location information adjustment request sent by the second electronic device in a collaborative display state, wherein the location information adjustment request is sent after the second electronic device detects that the second electronic device has moved; or determining, based on a preset periodicity in a collaborative display state, that a trigger moment of the detection of the relative location relationship is reached.

20. The first electronic device according to claim 16, wherein the updating the third location information by using the second location information is performed in response to determining that the second location information is inconsistent with the third location information.

\* \* \* \* \*